(12) United States Patent
Eshraghi

(10) Patent No.: US 6,399,232 B1
(45) Date of Patent: Jun. 4, 2002

(54) SERIES-CONNECTED MICROCELL ELECTROCHEMICAL DEVICES AND ASSEMBLIES, AND METHOD OF MAKING AND USING THE SAME

(75) Inventor: Ray R. Eshraghi, Cary, NC (US)

(73) Assignee: Microcell Corporation, Raleigh, NC (US)

( * ) Notice: Subject to any disclaimer, the term of this patent is extended or adjusted under 35 U.S.C. 154(b) by 8 days.

(21) Appl. No.: 09/621,228

(22) Filed: Jul. 24, 2000

(51) Int. Cl.[7] .................. H01M 2/18; H01M 4/04; H01M 6/10
(52) U.S. Cl. ............... 429/27; 429/94; 429/140; 29/623.1
(58) Field of Search ............... 429/40–45, 94, 429/127, 131–133, 136, 137, 140, 141, 164, 209, 27; 29/623.1, 623.5; 502/101

(56) References Cited

U.S. PATENT DOCUMENTS

| 4,100,331 A | 7/1978 | Ingham et al. ............... 429/13 |
| 4,123,596 A | 10/1978 | Robinson | |
| 4,420,544 A | 12/1983 | Lawson et al. ............... 429/13 |
| 4,522,897 A | 6/1985 | Walsh ............... 429/119 |
| 4,992,345 A | 2/1991 | Meintjes et al. | |
| 5,449,574 A | 9/1995 | Higley ............... 429/152 |
| 5,492,782 A | 2/1996 | Higley ............... 429/164 |
| 5,565,082 A | 10/1996 | Nakamatsu et al. | |
| 5,916,514 A | 6/1999 | Eshraghi ............... 29/623.1 |
| 5,928,808 A | 7/1999 | Eshraghi ............... 429/41 |
| 5,989,300 A | 11/1999 | Eshraghi ............... 29/623.1 |
| 6,004,691 A | 12/1999 | Eshraghi ............... 429/133 |
| 6,007,932 A | 12/1999 | Steyn ............... 429/31 |

FOREIGN PATENT DOCUMENTS

| DE | 2600169 A | 7/1977 |
| JP | 9223507-A2-97 | 8/1997 |

Primary Examiner—Gabrielle Brouillette
Assistant Examiner—Susy Tsang-Foster
(74) Attorney, Agent, or Firm—Steven J. Hultquist; Marianne Fuierer

(57) ABSTRACT

Series-connected microcell structures and assemblies are efficiently utilized for electrochemical generation/conversion of energy. The microcell structures of the invention are readily constructed from discrete fibrous microcell elements that are fabricated in sheet form and assembled into layered, sub-bundled and bundled conformations that produce high voltage, high power density outputs in applications such as fuel cell and battery systems.

38 Claims, 28 Drawing Sheets

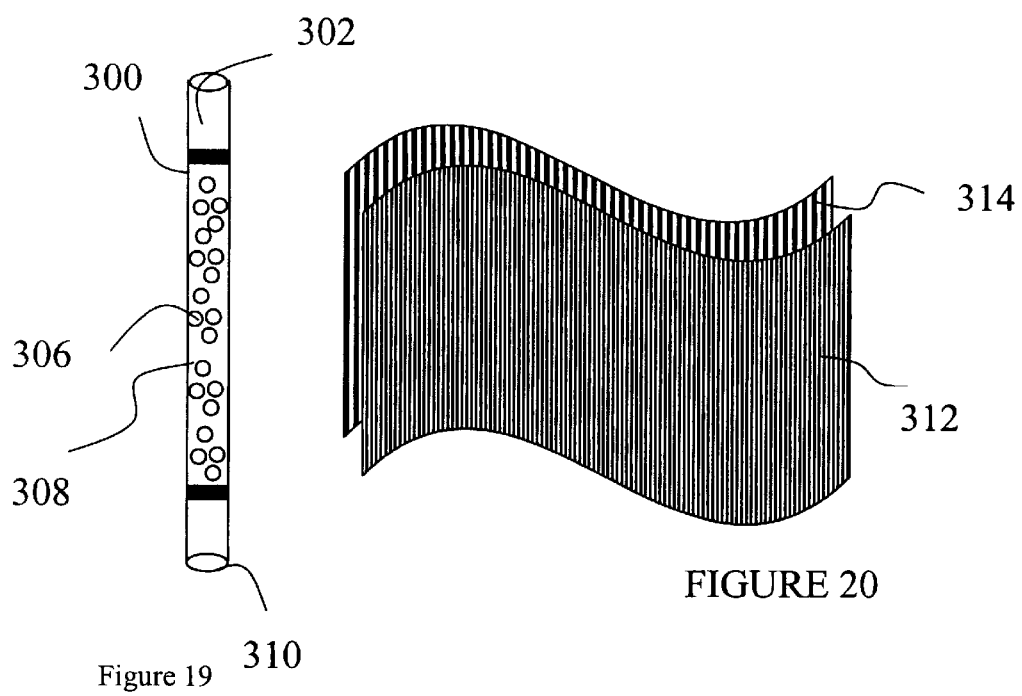
Figure 19
FIGURE 20
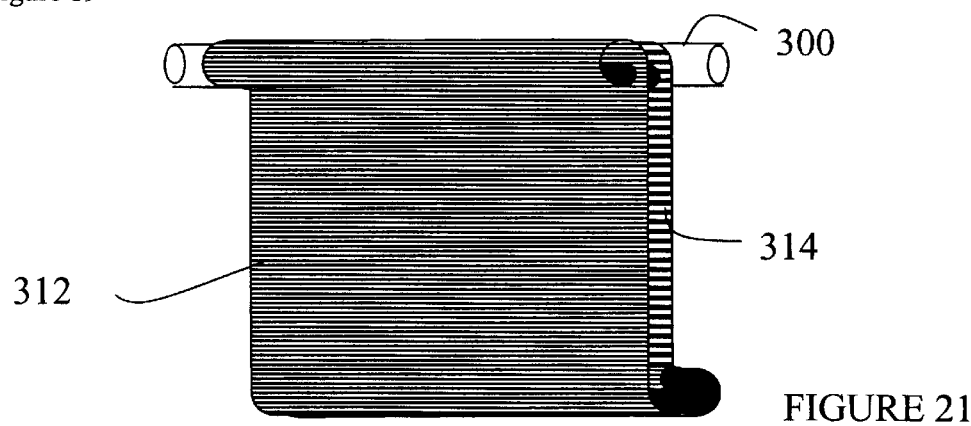
FIGURE 21
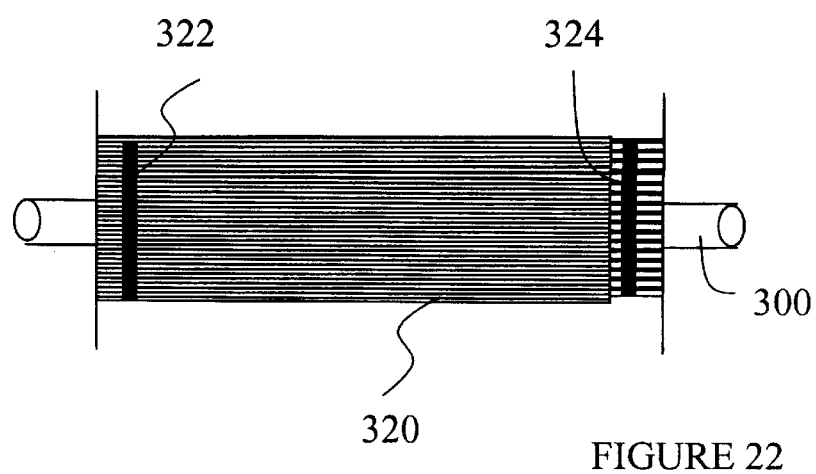
FIGURE 22

SERIES-CONNECTED MICROCELL ELECTROCHEMICAL DEVICES AND ASSEMBLIES, AND METHOD OF MAKING AND USING THE SAME

BACKGROUND OF THE INVENTION

1. Field of the Invention

This invention relates to microcell electrochemical devices and assemblies, methods of making same by various techniques, and use of such devices and assemblies.

2. Description of the Art

In the field of energy supplies and energy conversion devices, and particularly in the development of fuel cells and batteries, there has been continuing effort to develop devices with significant power outputs (high current and/or high voltage), high power density, and high energy output per unit volume.

Structurally, electrochemical cells such as batteries and fuel cells are relatively simple, utilizing respective positive and negative electrodes separated in such manner as to avoid internal short circuiting, and with the electrodes being arranged in contact with an electrolyte medium. By chemical reaction at the electrodes, the chemical energy of the reaction is converted into electrical energy with the flow of electrons providing power when the electrode circuit is coupled with an external load.

Battery cells may use separator plates between respective electrodes so that multiple sheet elements are arranged in successive face-to-face assemblies, and/or such sheets may be wound together in a (spiral) roll configuration.

The fuel cell is of significant current interest as a source of power for electrically powered vehicles, as well in distributed power generation applications.

In fuel cells, a fuel is introduced to contact with an electrode (anode) and oxidant is contacted with the other electrode (cathode) to establish a flow of positive and negative ions and generate a flow of electrons when an external load is coupled to the cell. The current output is controlled by a number of factors, including the catalyst (e.g., platinum in the case of hydrogen fuel cells) that is impregnated in the electrodes, as well as the kinetics of the particular fuel/oxidant electrochemical reaction.

Currently, single cell voltages for most fuel cells are in the range of about 0.6–0.8 volts. The operating voltage depends on the current; as current density increases, the voltage and cell efficiency correspondingly decline. At higher current densities, significant potential energy is converted to heat, thereby reducing the electrical energy of the cell.

Fuel cells also may be integrated with reformers, to provide an arrangement in which the reformer generates fuel such as hydrogen from natural gas, methanol or other feed stocks. The resulting fuel product from the reformer then is used in the fuel cell to generate electrical energy.

Numerous types of fuel cells have been described in the art. These include:

polymer electrolyte fuel cells, in which the electrolyte is a fluorinated sulfonic acid polymer or similar polymeric material;

alkaline fuel cells, using an electrolyte such as potassium hydroxide, in which the KOH electrolyte is retained in a matrix between electrodes including catalysts such as nickel, silver, metal oxide, spinel or noble metal;

phosphoric acid fuel cells using concentrated phosphoric acid as the electrolyte in high temperature operation;

molten salt fuel cells employing an electrolyte of alkali carbonates or sodium/potassium, in a ceramic matrix of lithium aluminate, operating at temperatures on the order of 600–700 degrees C., with the alkali electrolyte forming a high conductive molten salt;

solid oxide fuel cells utilizing metal oxides such as yttria-stabilized zirconia as the electrolyte and operating at high temperature to facilitate ionic conduction of oxygen between a cobalt-zirconia or nickel-zirconia anode, and a strontium-doped lanthanum manganate cathode.

Fuel cells exhibit relatively high efficiency and produce only low levels of gaseous/solid emissions. As a result of these characteristics, there is great current interest in them as energy conversion devices. Conventional fuel cell plants have efficiencies typically in the range of 40–55 percent based on the lower heating value (LHV) of the fuel that is used.

In addition to low environmental emissions, fuel cells operate at constant temperature, and heat from the electrochemical reaction is available for cogeneration applications, to increase overall efficiency. The efficiency of a fuel cell is substantially size-independent, and fuel cell designs thus are scalable over a wide range of electrical outputs, ranging from watts to megawatts.

A recent innovation in the electrochemical energy field is the development of microcells—small-sized electrochemical cells for battery, fuel cell and other electrochemical device applications. The microcell technology is described in U.S. Pat. Nos. 5,916,514; 5,928,808; 5,989,300; and 6,004,691, all to Ray R. Eshraghi. The microcell structure described in these patents comprises hollow fiber structures with which electrochemical cell components are associated.

The aforementioned Eshraghi patents describe an electrochemical cell structure in which the single cell is formed of a fiber containing an electrode or active material thereof, a porous membrane separator, electrolyte and a second electrode or active material thereof. Cell designs are described in the Eshraghi patents in which adjacent single fibers are utilized, one containing an electrode or active material thereof, the separator and electrolyte, with the second fiber comprising a second electrode, whereby the adjacent fibers constitute positive and negative electrodes of a cell.

The present invention embodies additional advances in the Eshraghi microcell technology.

SUMMARY OF THE INVENTION

The present invention relates to series-connected microcell electrochemical devices and assemblies, and methods of making and using the same.

In one aspect, the invention relates to a microcell assembly, wherein each microcell comprises:

an inner electrode, a microporous membrane separator in contact with the inner electrode, an electrolyte in pores of the microporous membrane separator, an outer electrode, such assembly comprising a first cell including a first microcell sheet member comprising a plurality of microcell fibers parallely arranged and interconnected in a substantially planar conformation, with inner current collectors of the microcell fibers axially extending from a first edge of a first sheet member, and a second sheet member of external current collectors overlying the first sheet member, with each current collector in contact with at least one microcell fiber of the first sheet member and extending beyond an opposite, second edge of the first sheet member;

an insulating sheet for electrical isolation of the first cell from a further cell overlying the insulating sheet;

a second cell including a first microcell sheet member comprising a plurality of microcell fibers parallely arranged and interconnected. in a substantially planar conformation, with inner current collectors of the microcell fibers axially extending from one edge of the second sheet member, adjacent the second edge of the first sheet member, and a second sheet member of external current collectors overlying the first sheet member, with each current collector in contact with at least one microcell fiber of the first sheet member and extending beyond the opposite edge of the first sheet member;

wherein the inner current collectors of the first cell are aligned with and electrically connected to the outer current collectors of the second cell to form a series connection therewith.

Another aspect of the invention relates to a microcell module, comprising:

a gas feed chamber including a perforate plate member;

a microcell assembly as described hereinabove, positioned on the perforate plate member, and potted at respective ends thereof by potting members forming respective seal faces which when the seal faces at their periphery are abuttingly reposed in a housing, form a shell and tube structural arrangement, wherein the perforate plate member is intermediately positioned between the potting members.

A still further aspect of the invention relates to a microcell sub-bundle article, comprising:

a sheet assembly including a first microcell sheet member comprising a plurality of microcell fibers parallely arranged and interconnected in a substantially planar conformation, with inner current collectors of said microcell fibers axially extending from a first edge of a first sheet member, and a second sheet member of external current collectors overlying the first sheet member, with each current collector in contact with at least one microcell fiber of the first sheet member and extending beyond an opposite, second edge of the first sheet member;

wherein the sub-bundle has been formed by axially rolling the sheet assembly into a cylindrical pre-form, applying a porous and electrically insulative wrap to the outer cylindrical surface of the cylindrical pre-form; and potting at respective ends of the cylindrical pre-form, to yield the sub-bundle, wherein the first and second sheet members form a cell.

Another aspect of the invention relates to a microcell article comprising a series of microcell sub-bundle articles, sequentially connected in positive-to-negative electrode arrangement, in a bundle wherein component sub-bundle articles are parallely aligned with one another in side-by-side relationship of consecutive sub-bundle articles, and the bundle has an axial dimension that substantially equal to the axial dimension of each sub-bundle article in the bundle.

A further aspect of the invention relates to a microcell article, comprising a plurality of microcell sub-bundle articles, arranged in side-by-side relationship, with electrodes of adjacent ones of the sub-bundle articles being electrically interconnected in positive-to-negative electrode relationship, and with the microcell article being potted at respective ends thereof.

Yet another aspect of the invention relates to a microcell module comprising a housing having mounted therein a plurality of microcell sub-bundles, wherein the housing comprises an interior volume bounded by respective end-plates, each end-plate having openings therein each of which is matably and sealingly engageable with a tubesheet of a corresponding sub-bundle, and wherein corresponding end-plate openings of the respective end-plates are in coaxial register with one another, such housing including a first end volume bounded by the end-plate at one end of the housing, and a second end volume bounded by the end-plate at the other end of the housing, a feed tube arranged for delivery of feed to the sub-bundles, and an outlet for discharging depleted feed from the interior volume, with such housing being selectively openable to expose an end-plate at at least one of the end volumes for accessing sub-bundles mounted in the end-plate for removal thereof and installation of a replacement sub-bundle, wherein the sub-bundles in the housing are series connected with one another and connected to a terminal leak-tightly extending exteriorly of the housing.

In a still further aspect, the invention relates to a method of making an electrochemical cell device, comprising:

forming a layer structure of sheets including a first sheet of fibrous microcell elements arranged in parallel side-by-side arrangement as a first sheet, and a second sheet comprising a parallelly aligned spaced-apart arrangement of external current collector elements in a second sheet;

mating the first and second sheets in longitudinally off-set relationship to one another, so that said external current collectors extend beyond an edge of the first sheet, and internal current collectors of the fibrous microcell elements extend beyond an opposite edge of the second sheet;

adding corresponding layers of corresponding first and second sheets to the initial layer of first and second sheets, and disposing a porous insulative sheet between each of the respective layers, to form a multilayer structure;

shaping the multilayer structure into a predetermined sub-bundle shape, and potting same to impart a permanent shape thereto, wherein the permanent shape provides localized conformations of internal and external current collectors;

fabricating a plurality of sub-bundles in corresponding manner;

connecting the sub-bundles in sequence to form a series arrangement of sub-bundles; and shaping the series-connected sub-bundles to form a bundle assembly.

A further aspect of the invention relates to a method of fabricating a microcell assembly, comprising:

forming a first layer including a first microcell sheet member comprising a plurality of fibrous microcell elements parallelly arranged and interconnected in a substantially planar conformation, with inner current collectors of the fibrous microcell elements axially extending from a first edge of a first sheet member, and a second sheet member of external current collectors overlying the first sheet member, positioning each current collector in contact with at least one microcell fiber of the first sheet member and extending beyond an opposite, second edge of the first sheet member;

disposing an insulating sheet on said first layer;

forming a second layer including a first microcell sheet member comprising a plurality of fibrous microcell elements parallelly arranged and interconnected in a substantially planar conformation, with inner current collectors of said fibrous microcell elements axially extending from a first edge of a first sheet member, and a second sheet member of external current collectors overlying the first sheet member, positioning each current collector in contact with at least one microcell fiber of the first sheet member and extending beyond an opposite, second edge of the first sheet member; and electrically connecting the inner current collectors of the first layer with the outer current collectors of the second layer to form a series connection therewith.

A still further aspect of the invention relates to a method of fabricating a microcell module, comprising:

providing a gas feed chamber including a perforate plate member;

positioning on the perforated plate member a microcell assembly comprising a plurality of fibrous microcell elements and associated external current collectors defining a plurality of microcells, and potting the microcell assembly at respective ends thereof by potting members forming respective seal faces which when the seal faces at their periphery are abuttingly reposed in a housing, form a shell and tube structural arrangement, wherein the perforated plate member is intermediately positioned between the potting members.

In another aspect, the invention relates to a method of fabricating a microcell sub-bundle article, comprising:

forming a sheet assembly including a first microcell sheet member comprising a plurality of microcell fibers parallely arranged and interconnected in a substantially planar conformation, with inner current collectors of the microcell fibers axially extending from a first edge of a first sheet member, and a second sheet member of external current collectors overlying the first sheet member, with each current collector in contact with at least one microcell fiber of the first sheet member and extending beyond an opposite, second edge of the first sheet member; and axially rolling the sheet assembly into a cylindrical pre-form, applying a porous and electrically insulative wrap to the outer cylindrical surface of the cylindrical pre-form; and potting respective ends of the cylindrical pre-form, to yield the sub-bundle, wherein the first and second sheet members form a cell.

A further aspect of the invention relates to a method of fabricating a microcell article comprising a series of microcell sub-bundle articles, said method including fabricating a plurality of microcell sub-bundle articles having positive electrode and negative electrode structures, parallely aligning said sub-bundle articles with one another in side-by-side relationship of consecutive sub-bundle articles, thereby forming a bundle of said sub-bundle articles, and electrically interconnecting the sub-bundle articles in series.

Other aspects, features and advantages of the invention will be more fully apparent from the ensuing disclosure and appended claims.

BRIEF DESCRIPTION OF THE DRAWINGS

FIG. 19 shows a perforated feed tube used as a mandrel in forming microcell structures.

FIG. 20 shows fibrous microcell and shell side current collector sheets that can be rolled or wound around the perforated tube of FIG. 19, with the sheets being shown during rolling in FIG. 21 and as finally rolled into shape in FIG. 22.

DETAILED DESCRIPTION OF THE INVENTION, AND PREFERRED EMBODIMENTS THEREOF

Figure 1:
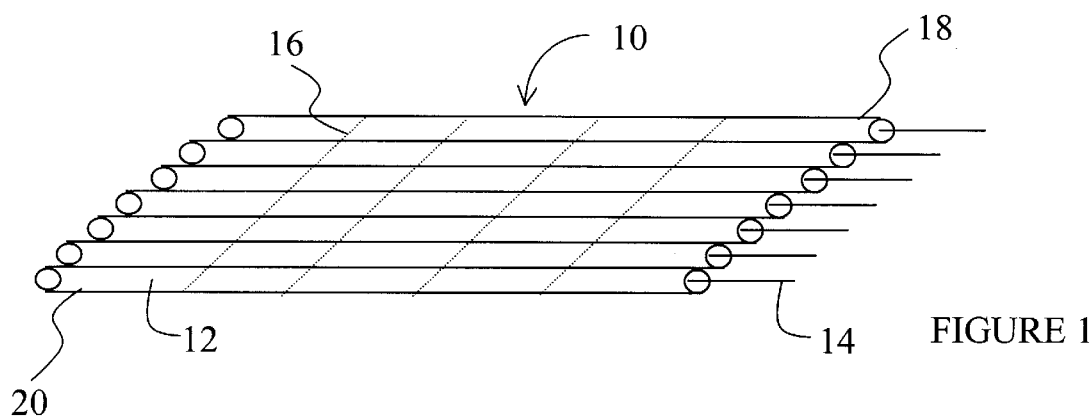
FIGS. 1–4 are perspective views of fibrous element structures illustrating the fabrication of a microcell assembly.

The disclosures of Eshraghi U.S. Pat. Nos. 5,916,514; 5,928,808; 5,989,300; and 6,004,691 hereby are incorporated herein by reference, in their respective entireties.

As used herein, the term microcell refers to an electrochemical cell energy generation or conversion structure, including a porous membrane separator having electrolyte disposed in porosity thereof. The porous membrane separator is in contact with electrically conductive fibers that in turn are in contact with or are coated with electrocatalyst forming positive and negative electrodes for the electrochemical cell.

While the ensuing description herein is primarily directed to fuel cell embodiments of the instant invention, it will be appreciated that the description can be analogously applied to corresponding battery cells and to other forms of electrochemical cell devices, consistent with the invention.

A battery cell of course differs from a fuel cell in that the (electrode) active material in a battery is present and stored in the cell, as opposed to being externally furnished to the structure when electrochemical activity is desired.

Accordingly, when used in a battery cell, the microcell does not require a lumen at the center of the fiber, thereby correspondingly simplifying the bundling of fibers in modular assemblies for battery cell applications. Microcells for battery cell applications thus have structural and operational differences from microcells used in fuel cells.

In a specific form, the microcell comprises an inner electrode active material, a microporous membrane separator in contact with the inner electrode active element, electrolyte in pores of the microporous membrane separator, and an outer electrode active element, wherein each of the inner and outer electrode active elements comprises at least one of electrode, current collector and electrocatalyst components.

In another specific form, the microcell may include a fibrous, inner electrode that is encapsulated by a microporous membrane separator with an electrolyte disposed in porosity of the microporous membrane separator, and with electrocatalyst impregnated or coated on the bore or shell side of the fiber (to form an inner or outer electrode, respectively) along with electrically conductive material.

In fuel cell applications, the bore of the microcell hollow fiber defines a lumen for passage therethrough of gaseous or liquid feed (e.g., fuel or oxidant) components. A wide variety of electrolyte types can be used in the microcell fuel cell, depending on the specific application involved.

In a preferred form, all components of the microcell are fabricated in a single fiber assembly. The microcells can be of any predetermined length, typically with a length to diameter ratio significantly greater than 1, and are readily formed into microcell assemblies, including bundled forms as hereinafter described in greater detail. Such microcell assemblies, or collections of such assemblies, may be aggregated to form a fuel cell module, similar in overall arrangement to a shell and tube heat exchanger.

When the microcell elements are fabricated into bundled multi-cell modules in a unitary overall construction, the resulting compact unitary configuration provides high density energy output and enables minimization of the volume (and "footprint") of the fuel cell or other electrochemical cell apparatus fabricated from such bundles.

The microcell apparatus of the invention in one embodiment is fabricated with the inner electrode (or a multiplicity of current collector fibers) being encapsulated by a microporous membrane separator. The electrocatalyst of the inner electrode in such embodiment is coated or impregnated on the inner wall of the membrane separator (or coated on the inner current collector fibers).

The electrocatalyst in one embodiment is impregnated onto the membrane separator wall from a catalyst solution. In another, alternative embodiment, a thin ink formulation of the catalyst is pumped through the bore of the membrane separator during the membrane spinning process.

One technique of forming porous separator membrane-electrode assemblies involves coating current collector fibers with an electrocatalyst formulation. Such coating in one embodiment is carried out in an extrusion process. In another embodiment, the current collector fibers are coated from a plating solution. In yet another embodiment, the current collector fibers are coated by plasma deposition of a metal catalyst.

In forming a fuel cell stack or module, the microcell fibers are bundled and potted in order to isolate and seal the bore side and the shell side of the cells. For large fuel cell structures, microcells may be bundled around a perforated mandrel, such that the mandrel becomes the gas input structure for the shell side of the cells.

With respect to the microporous membrane separator element as used in fuel cell embodiments and in other electrochemical cell embodiments of the present invention, any suitable means and method for electrolyte impregnation or incorporation are usefully employed. An illustrative and preferred technique for impregnation of the electrolyte is solution impregnation.

The porous membrane separator element itself can be of widely varying type and structure, and formed for a specific type of fuel cell or other electrochemical cell application. For polymer electrolyte fuel cells, for example, an asymmetric channelized porous structure is preferred to provide a contiguous phase of the ion exchange polymer adjacent to the electrocatalyst layer. For acid or alkaline fuel cells, a foam-like structure of the porous membrane element is desirable. The choice of membrane separator conformation and morphology is readily determinable without undue experimentation, as will be appreciated by those skilled in the art.

Fuel cells formed from microcells in accordance with a preferred aspect of the invention are monopolar and do not require bipolar flow field plates. Since the cells and current collectors are in fiber form, a high level of electrode surface area can be compacted in very small volumes. In parallel connection of individual bundled cells, wherein current is additive, very high current density per unit volume is achievable, allowing the microcell assembly to operate at high voltage and high efficiency.

In one embodiment, inner electrodes of respective microcells are connected to form a first terminal of a microcell assembly, and current collectors on the outer shell of the fiber elements or on the outer shell of a bundle of such microcells, forms a second terminal. When such assembly is constructed and arranged for fuel cell usage, fuel and oxidant are passed over electrodes on the corresponding respective shell and bore sides of the bundle. In the individual microcell elements of this fuel cell, the microporous membrane is impregnated with an appropriate electrolyte and forms a barrier or separator element. Depending on the electrolyte type, the microporous matrix and electrolyte can combine to form a new structure in the form of a solid matrix or a liquid-solid matrix.

In fuel cell applications utilizing microcell devices containing a single fiber inner electrode element, the size of the inner electrode element is selected to provide an appropriately dimensioned lumen on the bore side of the membrane separator containing the electrode. Multiple fibers can also be positioned in the bore of a hollow fiber membrane separator to provide interstitial space forming a lumen in the hollow fiber. The formation of the lumen is important since the lumen allows (liquid or gaseous) fuel or oxidant to reach the inner electrode in the operation of the fuel cell.

In a preferred form, an electrocatalyst and the electrically conductive material of a second electrode is coated, extruded or impregnated on the outer shell of the microporous membrane separator and electrolyte is disposed in the micropores of the membrane separator, to complete the microcell structure.

The microporous membrane separator may be formed of any suitable material of construction. In one embodiment, the microporous membrane separator is fabricated from a material selected from the group consisting of semipermeable, ion-exchange membranes, and a porous membrane coated on a shell or bore side thereof with a permselective or an ion-exchange polymer.

In the microcell structure, the inner electrode or current collector is retained in a tightly-held manner in the bore of the separator and is contiguous to the inner wall of the fiber, for interfacial contact with the electrolyte or electrolyte/electrocatalyst layer. The outer electrode or current collector also makes intimate contact with the shell side electrolyte, or with the electrolyte/electrocatalyst layer of adjacent cells, when the fibrous microcell structures are densely bundled with one another.

Accordingly, the lumen of the microcell structure in fuel cell applications must be sufficiently "open" to allow passage of the gaseous feed (fuel or oxidant) through the lumen during normal operation. For such purpose, the fuel cell apparatus desirably includes a pump, fan, blower, compressor, eductor, or the like. Since the flow rates required for fuel cell operation entail relatively low pressure differentials, pumping requirements (for gaseous feed flow through the lumen of the microcell hollow fiber) are readily accommodated by commercially available fluid driver devices of the abovementioned types.

Series Connection of Microcell Structures and Assemblies

To achieve high current density at a single microcell voltage level, a number of microcells are connected together in parallel. Parallel connection of microcells for such purpose is readily effected by bundling the microcells in parallel relationship to one another and connecting the end portions of the current collectors at each extremity of the resulting microcell assembly.

In order to achieve high voltages, however, above the voltage afforded by a single microcell, it is necessary to connect microcells in series with one another. As described more fully hereinafter, various methods may be employed to effect series connection, depending on the geometry of the microcell assembly that is desired. For example, a rectangular configuration or a cylindrical configuration may be desired.

In accordance with the invention, a sub-bundle of parallel fibrous microcells is first constructed to obtain the desired current. The sub-bundles then are connected in series to achieve a desired voltage. One preferred approach to forming a sub-bundle microcell assembly is to form a sheet arrangement of generally parallelly aligned microcell elements, wherein the microcells are in side-by-side relationship to one another, with the current collectors extending from one end of the generally planer sheet, in side-by-side register with one another (i.e., so that the current collector ends are generally arranged in a single plane with respect to one another, or otherwise so that the current collectors protruding from the microcells are generally coextensive in length relative to the face of the microcell sheet assembly from which they protrude). Next, the first layer of microcell elements is overlaid by a second layer comprising outer current collector elements, arranged so that the outer current collectors extend from an opposite side of the superimposed sheet from that from which the inner current collectors protrude. The outer current collectors likewise extend outwardly to a generally same length, so that the ends of the outer current collectors are in register with one another, residing generally in a single vertical plane relative to a flat, horizontal plane of the sheet assembly.

For purpose of forming the above-described sheet assembly, the constituent fibrous microcell elements in the first layer may be secured to one another to provide a unitary web or sheet form of such elements. In like manner, the outer current collectors overlaid on the fibrous microcell elements may be secured to one another to a sheet or web confirmation, such as by an inner connecting mesh or woven structure, transversely laid strips of adhesive tape, or other means by which a parallel assembly of current collector elements is provided.

It will be appreciated that any suitable means and methods may be employed to form the respective sheet-like layers of the microcell assembly just described. Such layers can be pre-formed, for example, by weaving the microcell or current collector fibers into sheets or embedding them in a resinous matrix, or in any other suitable manner.

Once the layer of microcell elements and the layer of outer current collector elements is contacted in superimposed relationship with one another, the composite structure then can be rolled into a cylindrical shape and potted at each of respective opposite ends, to form a sub-bundle assembly comprising a multiplicity of microcells.

Potting of such assembly can be carried out in any suitable manner, using methods conventionally employed to pot hollow fiber membranes, e.g., in the fabrication of hollow fiber filtration modules. Each resultant potted sub-bundle thereby has a positive and negative terminal at each end, with one such terminal being formed by the inner current collector elements protruding from the microcell elements of the first-described layer, and the other terminal being formed by the outer current collector elements protruding from the opposite end of the sub-bundle.

Sub-bundles then are connected in series by connecting the positive terminal of a first sub-bundle to a negative terminal of a next sub-bundle, and so on in consecutive fashion. The resulting long strand of connected sub-bundles then is re-bundled into a cylindrical shape, by folding each bundle in an alternating fashion at each end and at the connection between each succeeding microcell. The resulting assembly of sub-bundles folded into parallel arrangement with one another then is potted again at each end thereof to form a bundle as a composite structure comprising a multiplicity of sub-bundles.

The bundle in consequence contains fibrous microcells in both parallel and series connection, constituted in a unitary structure that may then be placed in a casing in the manner of a shell and tube heat exchange assembly, as hereinafter described in greater detail.

It is evident from the foregoing discussion that the avoidance of short-circuiting between sub-bundles requires that each sub-bundle be covered or encased with a porous yet electrically insulating material. Accordingly, each sub-bundle may be sheathed or sleeved in a fiberglass or polymeric material encasement member, in to which the sub-bundle may be inserted or about which the encasement material may be wrapped.

Sub-bundles alternatively may be formed and the packed into a bundle by alternating each end so that a positive terminal end of a sub-bundle is in proximity to a negative terminal of another sub-bundle. The sub-bundles in this alternative technique can first be potted and then connected in series, by connection of the positive terminal of a first sub-bundle to a negative terminal of a next adjacent sub-bundle. The sub-bundles may be connected simply be making an electrical connection between each microcell. Alternatively, an end plate having a mirror image of the location of sub-bundle connection nodes (where all the microcell fibers are connected in parallel in a sub-bundle) on its face, and an imprint of series connections of the terminals designed and built into the plate may be employed, so that electrical connection of the plate with each node of the bundle will automatically yield a series connection.

As yet another alternative to sub-bundle potting, each sub-bundle may be fabricated with a sealed tube sheet member at each end. Each sub-bundle then can be inserted into a casing having openings at each end thereof that are the same size as the parameter (outer circumference) of the sub-bundle. In such fabrication, each sub-bundle may be sealed at each respective end of the housing, e.g., with O-ring seals or other sealing means, without the requirement of having to pot the sub-bundles again. In such configuration, each sub-bundle can be removed from or introduced to the housing in a simple and readily affected manner, allowing for increase or reduction in power generation capacity of the overall microcell apparatus.

Alternatively, a sub-bundle article can be fabricated in.a rectangular confirmation by placing layers of microcells and outer current collectors over each other in alternating and repeating sequence to achieve a desired height and rectangular cross-section. The constituent layers of microcell fibrous elements and outer current collectors can be pre-formed in sheet-like form, as previously described.

In forming a series connection of sub-layers of respective fibrous microcell elements and outer current collectors in the respective layers, the current collector elements are generally of similar length characteristics to the fibrous microcell elements, such that respective fibrous microcell element and outer current collector layers are longitudinally off-set in relation to one another. In such arrangement, the outer current collector elements are longitudinally displaced beyond one end of the fibrous microcell element layer, and is correspondingly shorter at the opposite end so that the first layer (underlying layer) of fibrous microcell elements extends beyond the ends of the layer of outer current collectors.

Thus, at each end of the layered assembly, there is a line of "short ends" of the upper or lower layer, and it is at this short end that the potting member is formed at each of the ends of the overall assembly.

On this sub-layer assembly a layer of porous, electrically insulating sheet material is placed, and a second sub-layer assembly then is formed on the porous, electrically insulating sheet. In the second sub-layer assembly, a bottom layer is placed directly on the porous, electrically insulating sheet and overlaid with a layer of outer current collectors, off-set from one another, and arranged such that the positive terminal of the new sub-layer is on the same side of the overall assembly as the negative terminal of the first sub-layer. This pattern of fabrication is continued until a desired sub-layer height is reached and a desired voltage is achieved. The ends of the respective positive and negative current collectors from each end are then connected to each other with, for example, an electrically conductive rod or strip member, as hereinafter described.

Alternatively, the layered assembly may be fabricated, with electrical connection of the fiber sheets with positive and negative ends from adjoining sub-layers initially, prior to stacking of the respective sub-layers. A final stack of sub-layers is then potted at both ends of the assembly, to isolate and seal the bore of the sub-layer assembly from the shell side. The potted bundle of the fiber stack then can be placed on a perforated duct that will function as a feed inlet to the shell side of the hollow fibers in the assembly. The fibrous microcell elements and the outer current collectors can alternatively be potted as the fibers are being layered, e.g., by depositing a line or bead of epoxy or other potting compound at both ends as the respective layers are being laid. The viscosity of the potting material is suitably chosen so that complete wetting of the fibrous microcell elements takes place, to ensure leak-tightness of the resultant tube sheet.

Once potted, the bundle or stack of microcell layers is placed in a housing such that the shell and bore of the microcell elements are sealed and isolated when a feed is introduced on either side (shell side or bore side). The resulting unit has the confirmation of a rectangular shell and tube heat exchanger, and such unit is advantageously fabricated with at least one inlet to the housing for introducing feed to the bore side and at least one outlet in the housing for removing depleted feed from the bore side.

When the microcell elements are provided in a stack of layers, such stack is placed on a duct perforated between the potting members at respective ends. A non-perforated section of the duct extends through one end of the housing, e.g., with the feed inlet or outlet on the bore side of the microcell elements, as described, and with the duct extending sealingly through the housing to provide a feed inlet to the shell side of the microcell elements. The layered microcell stacks may be placed on both sides of a perforated feed duct to form a symmetric double stack, as hereinafter described in greater detail.

In accordance with one aspect of the present invention, small sub-bundles of microcell assemblies can be electrically connected in series in the same cell housing, or smaller fuel cell modules can be electrically connected in series to increase the overall cell voltage. One approach for achieving high voltage levels, in accordance with another embodiment of the present invention, is to manifold fuel cell stacks (each comprising a plurality of microcell devices) to gas feeds in a parallel fashion, with the stacks themselves being series-connected assemblies of microcell bundles.

In one embodiment, electrically conductive fibers are bundled with microcell devices, so that the electrically conductive fibers function as current collectors on the shell side of the fibers. The shell side current collectors, or alternatively the outer electrodes coated with suitable electrocatalyst, are connected to a common plate to constitute a first terminal for the bundled assembly. Correspondingly, inner electrodes extending through the bore of the microcell fibers are connected to a plate forming a second terminal for the assembly.

In such fuel cell assembly, fuel or oxidant is passed over the electrodes on the corresponding respective bore or shell side of the fibers, and the electrolyte-incorporating membrane separator prevents migration of the fuel or oxidant to the other electrode.

In accordance with the invention, the microcell fiber structures are usefully potted to form sub-bundles of a larger ultimate bundled structure, with the sub-bundles being connected in series or parallel (or, as discussed hereinafter, some structures or sub-bundles can be parallel connected, with the parallel-connected assembly of microcell elements then being series-connected to other sub-bundles; the converse arrangement, wherein series-connected microcell elements form sub-bundles that are parallel-connected to one another, also is usefully employed in some applications).

In one preferred embodiment, sub-bundles of the microcell fiber structures are fabricated, and then the sub-bundles are aggregated with other sub-bundles, and potted again to form the fuel cell module. The potting medium advantageously used for such structural fixation of the microcell fiber structures or sub-bundles is any suitable potting or encapsulant medium, such as epoxy, urethane, silicone, EPDM rubber, or other encapsulant media.

The sub-bundles can be made with tube sheets at each end with O-ring seals, similar to the process employed in the final module assembly, and with the sub-bundles then inserted in a metal or polymeric sheet material having holes formed in it. The fuel cell casing then will have two faces, one at each end, with holes cut into it the size of the outer diameter of the sub-bundled tube sheet.

By this arrangement, sub-bundles can be added to or removed from the overall module to increase or decrease power (e.g., in a power source for stationary application, or alternatively for motive transport applications such as electrical vehicles, to provide adjustable vehicle power). The holes in the faces can be sealed with blank sheets of the same size as the holes, if sub-bundles are removed from the module. This feature also provides capability for servicing individual sub-bundles, by removing defective sub-bundles and replacing them with new sub-bundles. The sub-bundles can themselves be potted units comprising smaller sub-bundles.

FIGS. 1–4 are perspective views of fibrous element structures illustrating the fabrication of a microcell assembly.

As shown in FIG. 1, a fibrous microcell element sheet 10 is formed of a plurality of fibrous microcell elements 12, laid side by side one another in parallel alignment. The respective fibrous microcell elements 12 can be consolidated by a plurality of sewn seams 16 as shown, or by use of tape, adhesive bonding or other method of affixation to produce a unitary fibrous microcell element sheet.

The sheet 10 as illustrated is aligned with first ends 18 of the elements 12 being in transverse register with one another, i.e., the ends are generally coextensive in axial extent with one another, so that the ends 18 lie in a common vertical plane extending across the face of the sheet from which the internal current collectors 14 protrude.

In like manner, the opposite ends 20 of the fibrous microcell elements 12 are in transverse register with one another, with the ends generally aligned with one another in a transversely extending vertical plane at the opposite face of the fibrous microcell elements 12.

In this manner, the fibers are laid flat adjacent to one another and consolidated in a web structure, to form a sheet of fibers.

Figure 2:
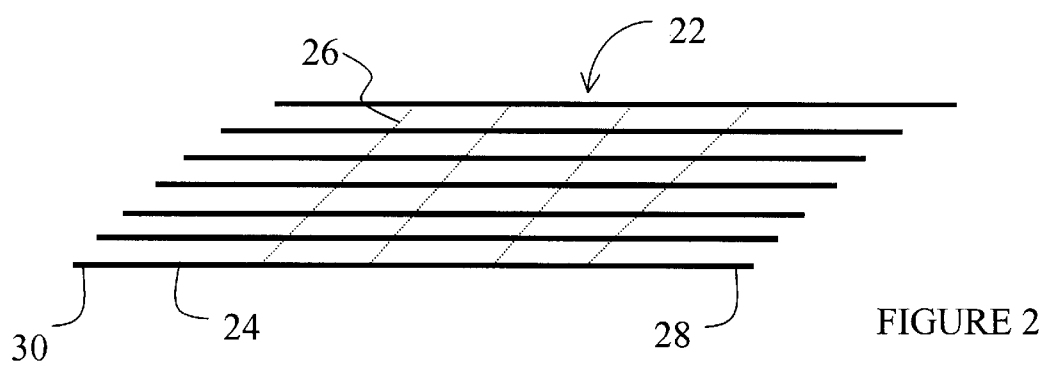

A plurality of external current collectors 24 are likewise secured together in parallelly aligned side by side arrangement, by a sewn seam 26, or alternatively, a tape, glue strip, or other consolidating means, to form a sheet 22 as shown in FIG. 2. In such sheet 22, the respective ends 28 and 30 of the constituent current collectors 24 are in register with one another so that all ends of the fibrous current collectors at each extremity of the web lie in a transversely extending vertical plane at such extremity.

Figure 3:
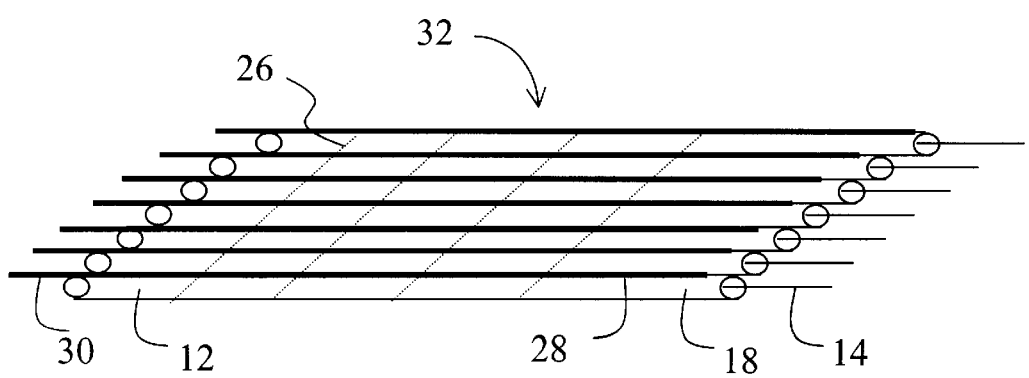

Next, the sheet 10 of fibrous microcell elements 12 and the sheet 22 of fibrous current collector elements 24 are stacked, with the current collector sheet 22 on top of the fibrous microcell elements sheet 10, to form a conjoint structure 32 as shown in FIG. 3.

In such conjoint structure 32, the respective sheets 10 and 22 are longitudinally off-set with respect to one another, so that the internal current collector elements 14 of sheet 10 extend beyond the ends of the external current collectors of sheet 22 as shown, and with the external current collectors of sheet 22 correspondingly extending beyond the ends of the internal current collectors 14 of sheet 10 at the opposite end of the conjoint structure. The respective external current collectors of the overlying sheet 22 thus are in contact with associated fibrous microcell elements in the underlying sheet 10.

Figure 4:
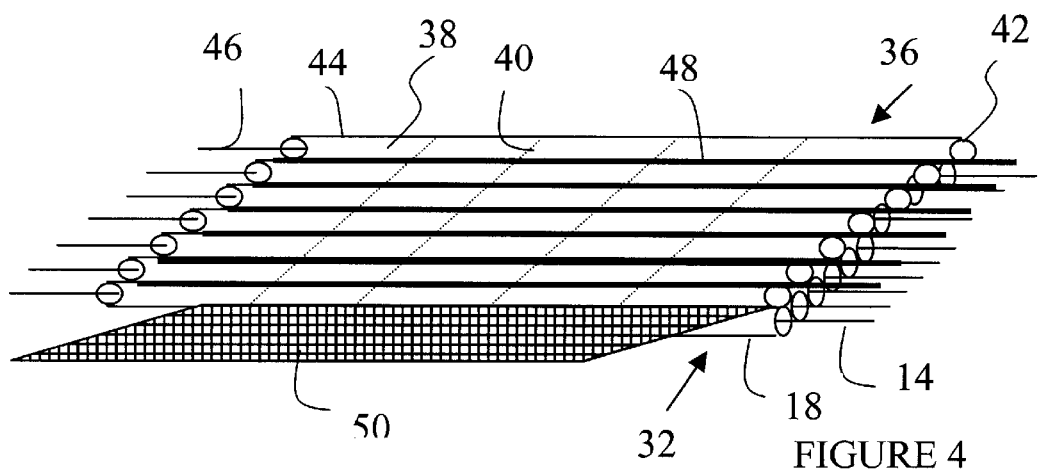

In FIG. 4, the conjoint structure 32 of FIG. 3 is a bottom layer of an assembly that is formed by overlying the bottom layer with a second layer 36 including a parallely aligned arrangement of fibrous microcell elements 38 forming a corresponding sheet, and overlaid in the second layer by a sheet including external current collectors 48 secured together by a sewn seam 40 as shown.

In the second layer, the fibrous microcell elements 38 are in register with one another at their respective ends 42 and 44, and the sheet of external current collectors 48 is longitudinally displaced from the sheet of fibrous microcell elements 38. By such arrangement, the external current collectors 48 extend beyond the ends 42 of the fibrous microcell elements 38, and the internal current collectors 46 of the fibrous microcell elements 38 extend beyond the ends of the external current collectors 48.

Concurrently, the longitudinally protruding current collectors from the respective first and second layers at each of the ends of the assembly are coextensive in axial extent with one another. A porous insulating layer of polymeric or fiberglass sheet 50 is placed between the layers 32 and 36, as shown in FIG. 4.

Figure 5:
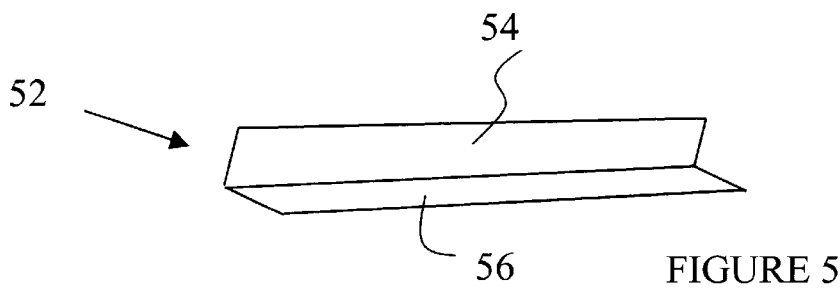
FIG. 5 is a perspective view of a connector for joining current collector or electrode elements of a microcell fiber assembly.

FIG. 5 is a perspective view of a connector 52 for joining current collector or electrode elements of a microcell fiber assembly. The connector 52 has two leaves 54 and 56 that are at a 90° angle in relation to one another, with the leaves being crimpable toward one another. When a group of current collector or electrode elements is placed between the leaves of the connector and the leaves are crimped together, the current collector or electrode elements then are secured in electrical contact with one another.

Figure 6:
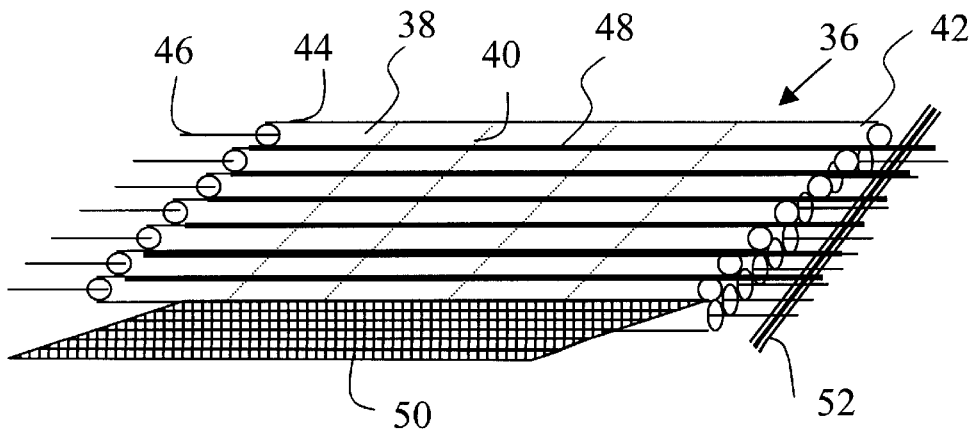
FIG. 6 is a microcell assembly according to one embodiment of the invention, with a terminal at one end of the assembly.

FIG. 6 shows the microcell assembly of FIG. 4, with the current collector elements at the right-hand portion of the drawing shown as being secured to the connector 52 so that the current collector elements are coupled in electrical contact with one another.

Figure 7:
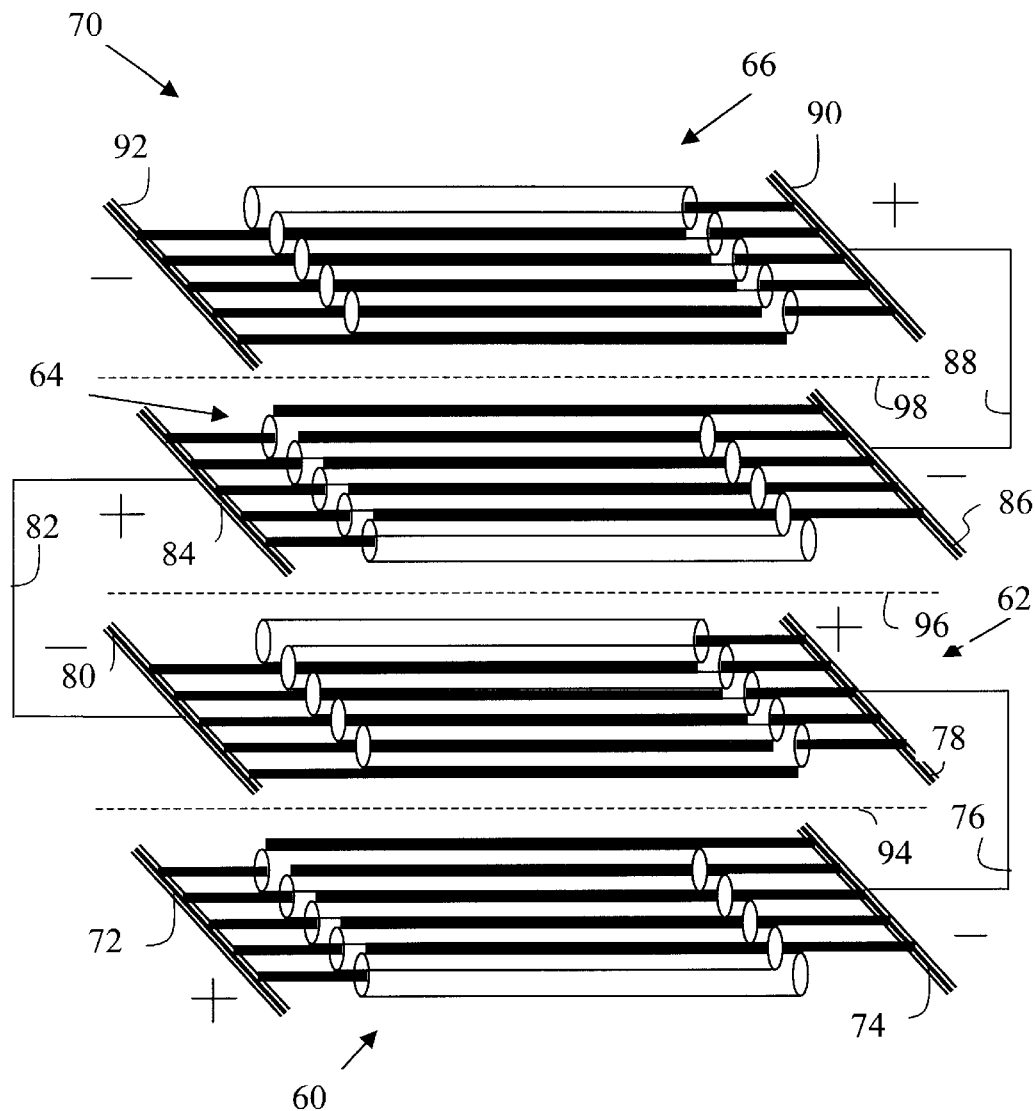
FIG. 7 is an exploded perspective view of a microcell assembly showing series-connected microcell sheets.

FIG. 7 is an exploded perspective view of a microcell assembly 70 showing series connected microcell sheet layers 60, 62, 64 and 66. The bottom sheet layer 60 comprises internal current collector elements that are connected by connector 72, and the overlying sheet of external current collectors in such layer are in turn joined to connector 74.

The next upper layer in the assembly includes internal current collectors connected by connector 78, which is joined by interconnect 76 to connector 74, as well as external current collectors joined to connector 80.

Connector 80 is joined by interconnect 82 to connector 84 of the next upper layer in the assembly. Connector 84 connects the internal current collectors of such next upper layer, and the connector 86 at the opposite end of the layer connects external current collectors of the layer to the connector 90 of the top layer in the assembly via interconnect 88.

Connector 90 connects the internal current collectors of the top layer in the assembly and the external current collectors at the opposite end of the top layer of the assembly are connected by connector 92.

Each of the constituent layers in the assembly is separated from an adjacent layer by a corresponding porous insulative sheet 94, 96 and 98, respectively.

By the foregoing arrangement, each of the constituent layers in the assembly of FIG. 7 is joined to a next adjacent layer in head-to-tail series relationship, as is evident from the indicated polarity of the respective connectors in the drawing.

Figure 8:
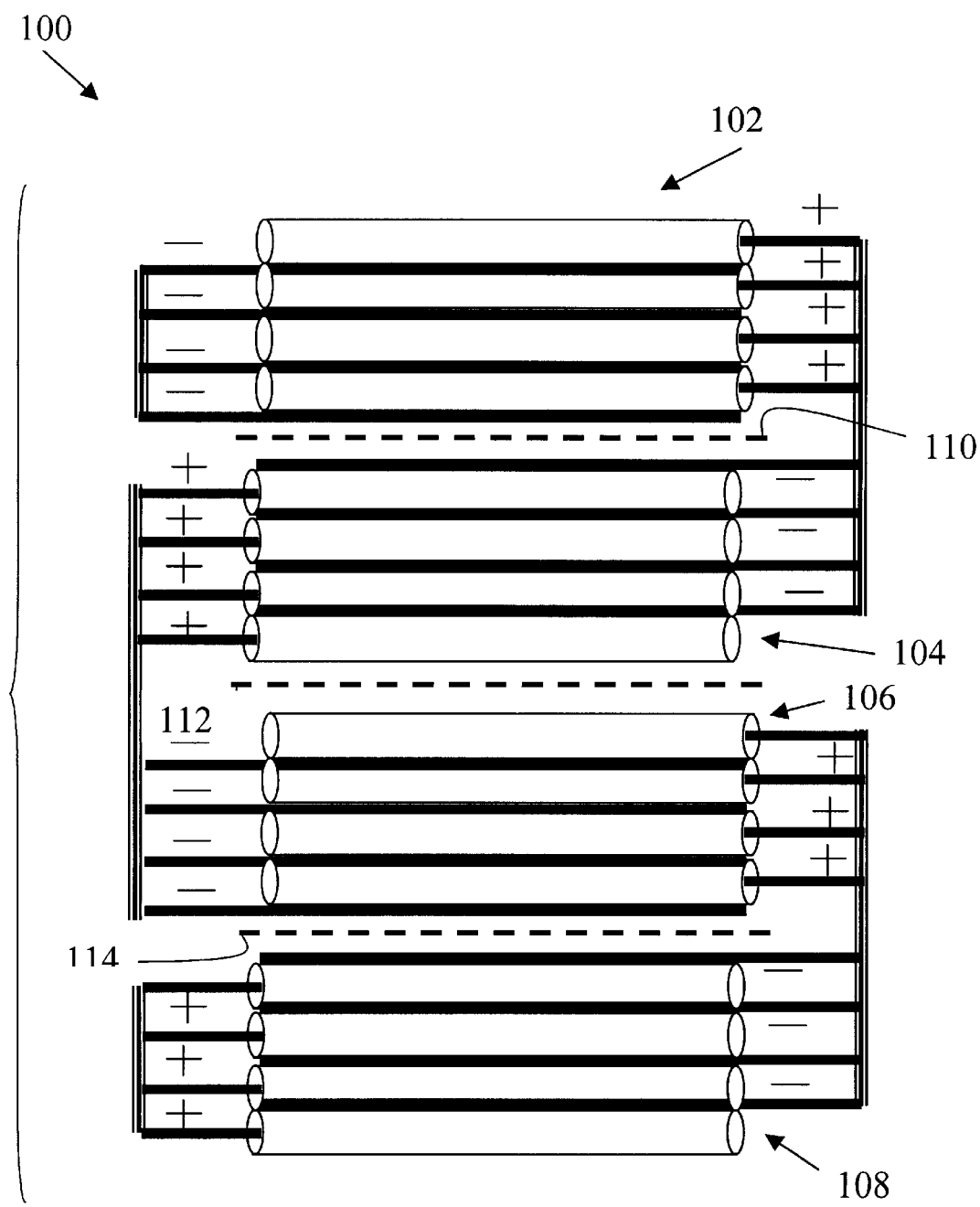
FIG. 8 is a schematic view of a layered arrangement of microcell sheets, joined in series relationship.

FIG. 8 is a schematic view of an assembly 100 comprising a layered arrangement of microcell layers joined in series relationship, including layers 102 and 104, separated by porous insulating sheet 110, layers 104 and 106, separated by porous insulating sheet 112, and 106 and 108, separated by porous insulating sheet 114.

Figure 9:
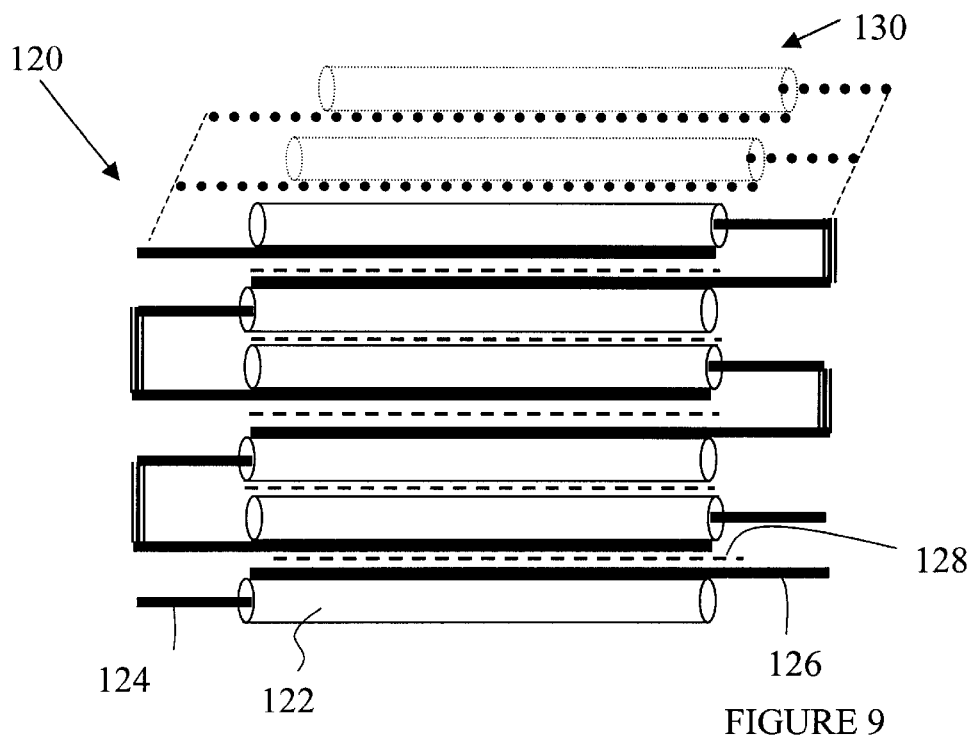
FIG. 9 is a 3-dimensional perspective view of a series-connected arrangement of microcell layers.

FIG. 9 is a three-dimensional perspective view of a series-connected arrangement 130 of microcell layers. The lowermost layer is illustrative and comprises a sheet of fibrous microcell elements 122 from which internal current collector elements 124 protrude at the left-hand side of the layer, with overlying sheet of external current collector elements 126 completing the microcell layer. The lowermost layer is shown as being electrically segregated from the next upper layer by a porous insulating layer 128, as schematically illustrated. The other layers are analogously constructed. The uppermost layer 130 as shown comprises three fibrous microcell elements arranged in side-by-side relationship, and the other sheets of fibrous microcell elements in the assembly are correspondingly constituted. In this manner, a bundled microcell structure is formed.

Figure 10:
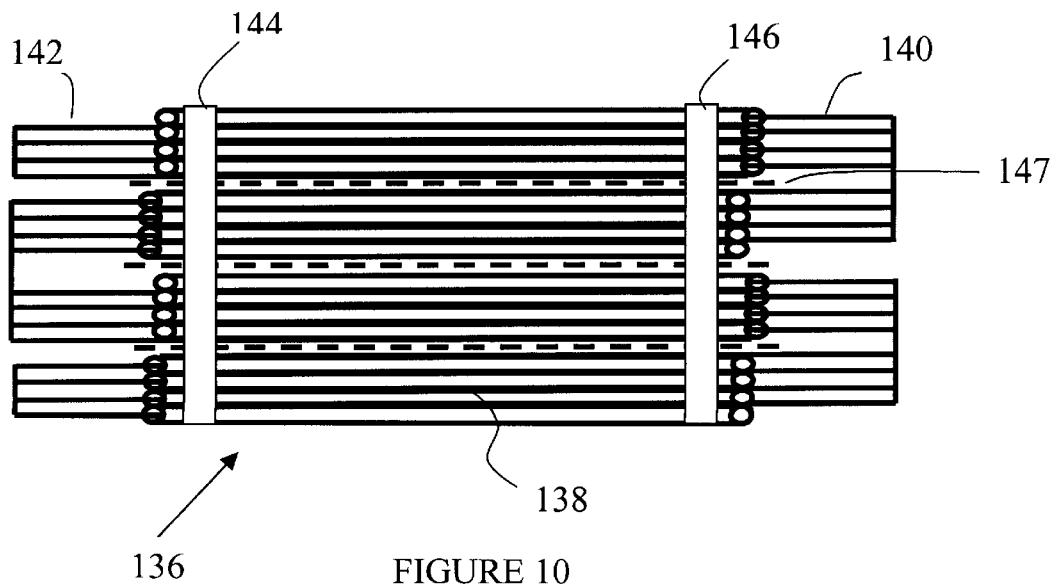
FIG. 10 shows a potted arrangement of microcell sheets.

FIG. 10 shows a potted arrangement 136 of microcell sub-bundles 138, in which component sub-bundles are connected by series connection of their respective opposite current collector elements 140 and 142, wherein adjacent sub-bundles are separated from electrical contact and potential short-circuiting by porous, insulative sheet 147. As shown, the sub-bundles 138 are potted at their respective ends by potting members 144 and 146.

Figure 11:
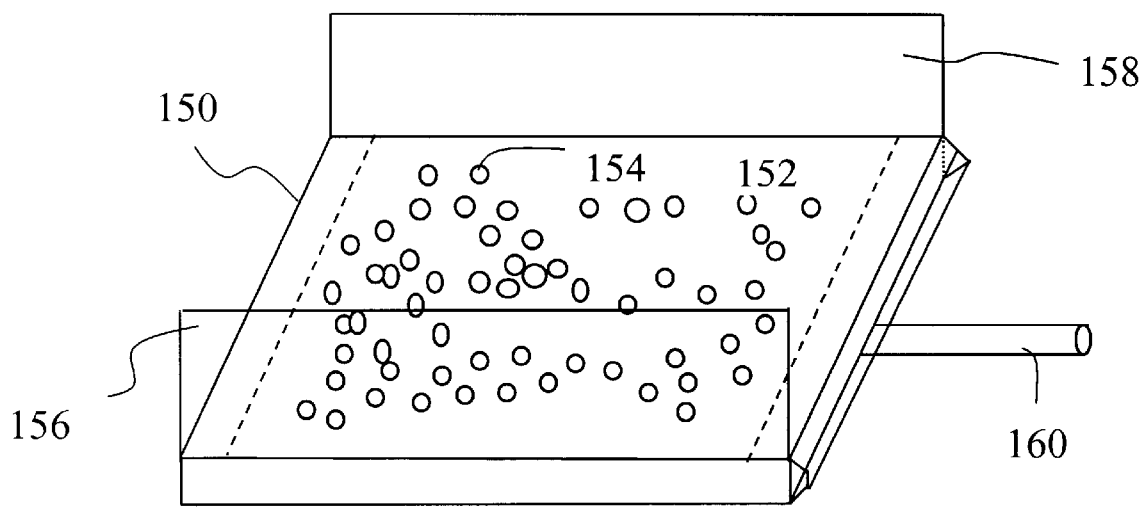
FIG. 11 is a perspective view of a duct that is perforated on the top surface, and optionally on the bottom surface for the fabrication of double stack bundles of electrochemical cells.

FIG. 11 is a perspective view of a duct 150 that is perforated with openings 154 on the top surface 152, and optionally on the bottom surface (not shown in the view of FIG. 11) for double stack bundles of the microcell layers. Two retaining walls 156, 158 are on each side, to retain the fiber sheets in position. Fibers are stacked on top of each other on the perforated duct until the desired voltage is achieved. A fluid ingress/egress conduit 160 is joined to the interior plenum chamber of the duct 150, as shown.

Fiber sheets can be potted with epoxy as they are laid. Alternatively, the fiber sheets can be bundled and potted in the vessel to finish the procedure. Fibers are potted at each end such that the open end remains open. The perforated duct will be the feed port to the shell side of the fibers.

Figure 12:
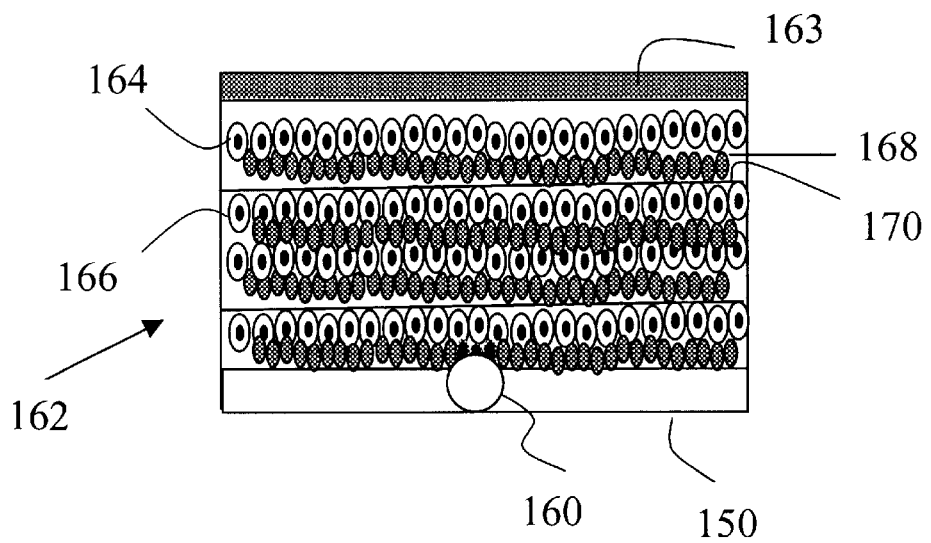
FIG. 12 is a cross-sectional elevation view of a microcell fiber bundle potted in a vessel.

FIG. 12 shows a cross-sectional elevation view of a fiber bundle 162 potted in a vessel 150. The fiber bundle comprises layers 164 and 166 of fibrous microcell elements, with an interposed sheet 168 of external current collector elements and with a separator sheet 170 of porous insulative material between adjacent current collector and fibrous microcell element sheets. The bundle is potted by potting member 163.

Figure 13:
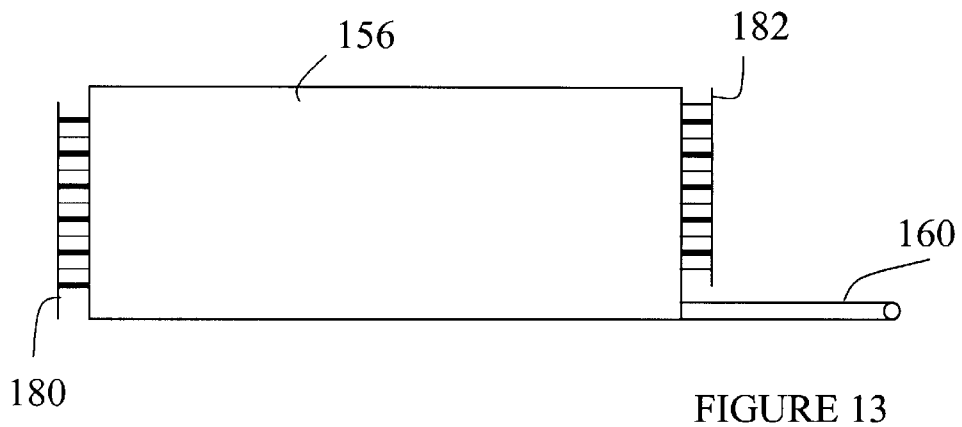
FIG. 13 is a side elevation view of the vessel of FIG. 12.

FIG. 13 is a side elevation view of the vessel of FIG. 12, showing the retaining wall 156, and fluid ingress/egress conduit 160 of the housing, as well as the terminal connections at the respective faces 180 and 182 of the bundle.

Figure 14:
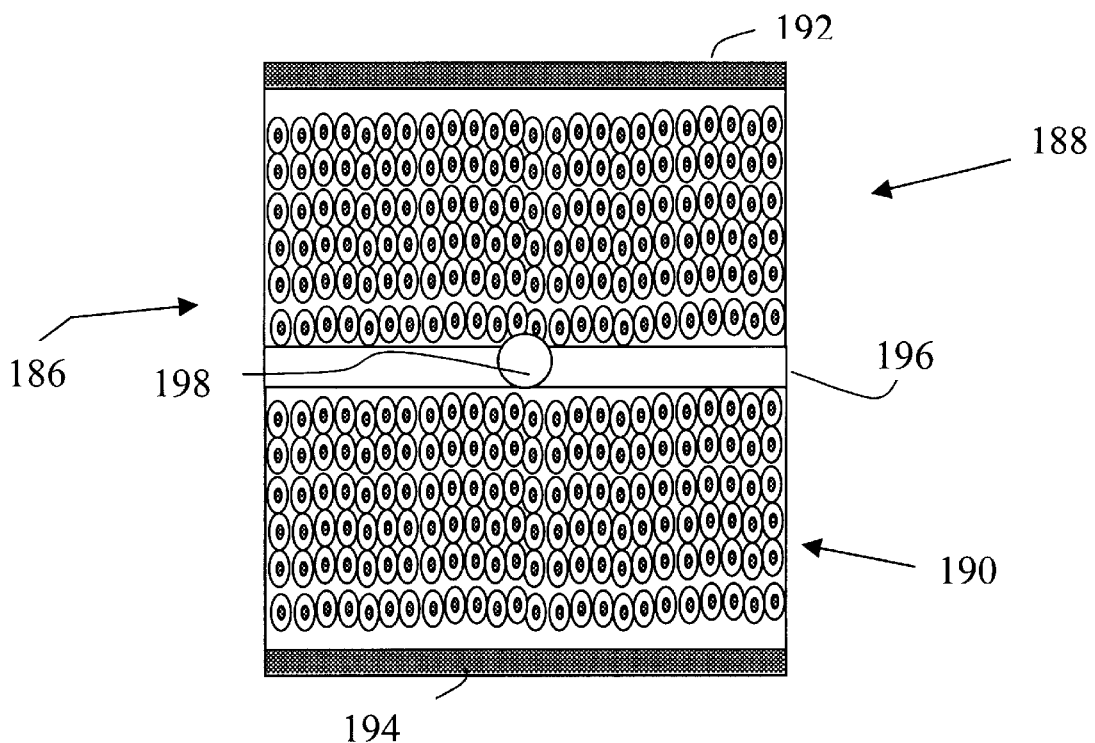
FIG. 14 is an elevational cross-sectional view of a double stack of microcell sheets.

FIG. 14 shows a potted arrangement 186 of fibrous microcell element sheets, in two sub-bundles 188 and 190 on opposite sides of feed duct 196 receiving feed gas via inlet 198. The feed duct has perforations on both top and bottom surfaces, and each of the constituent sub-bundles is potted with the top sub-bundle being potted by potting member 192 and the bottom sub-bundle being potted by potting member 194.

Figure 15:
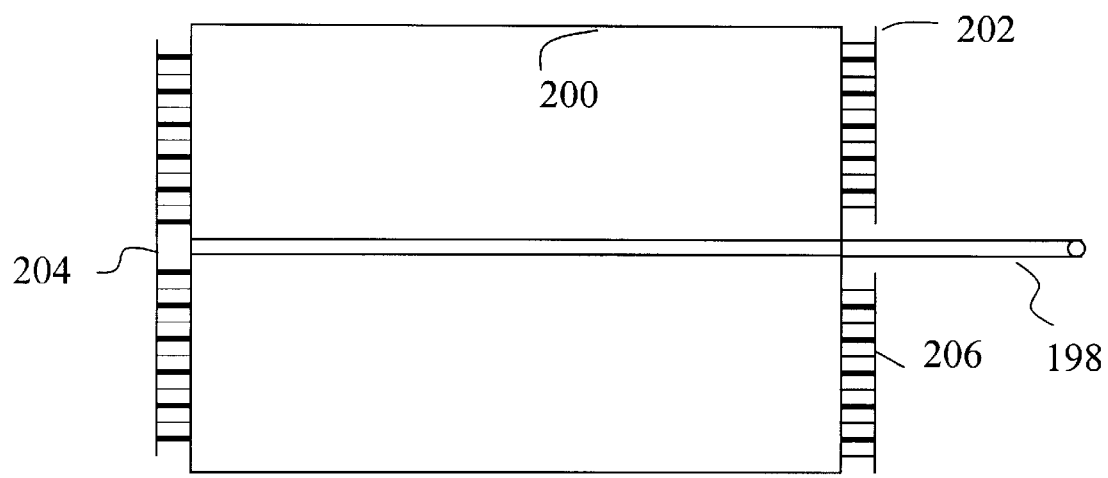
FIG. 15 is a side elevation view of a double stack of microcell devices arranged in sheets, comprising a stack on each side of a perforated duct.

FIG. 15 shows a side elevation view of a double stack arrangement 200, comprising a stack of microcell elements on either side of the perforated duct. The gas feed 198 is shown in the drawing. The arrangement shown in this drawing includes connector/terminal elements 202, 204 and 206 connecting the corresponding current collector elements.

Figure 16:
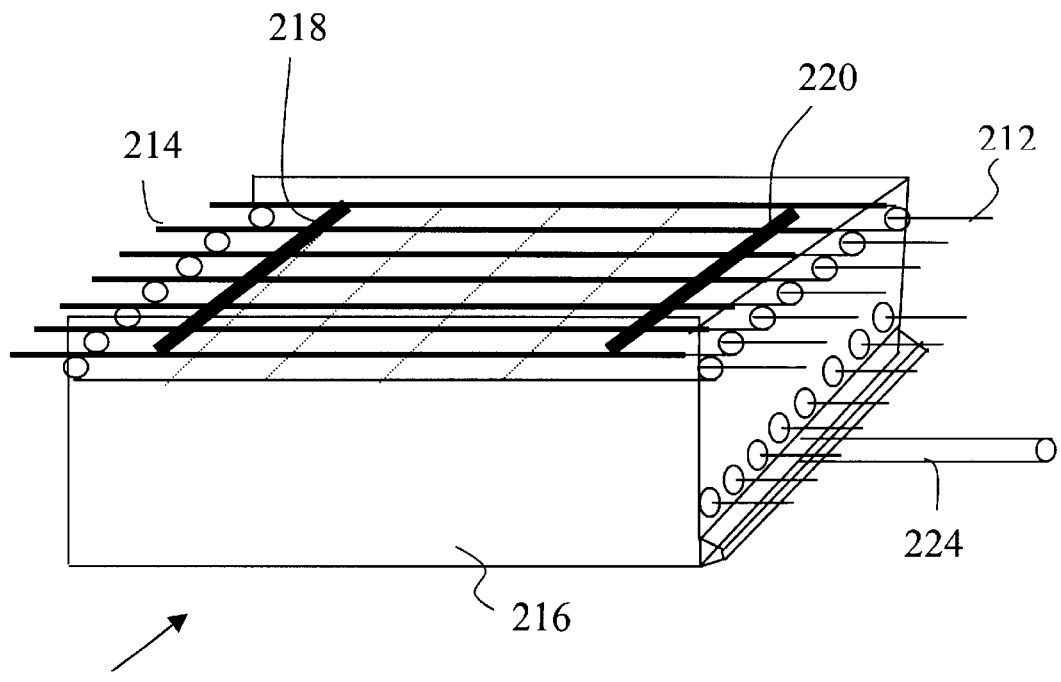
FIG. 16 is a perspective view of potted fibers on one side of a perforated feed duct.

FIG. 16 is a perspective view of an assembly 210 of potted fibrous microcell elements on one side of a perforated feed duct including gas inlet 224 and retaining wall 216. The potted rectangular bundle of microfibers is arranged with its respective ends potted by potting members 218 and 220.

Figure 17:
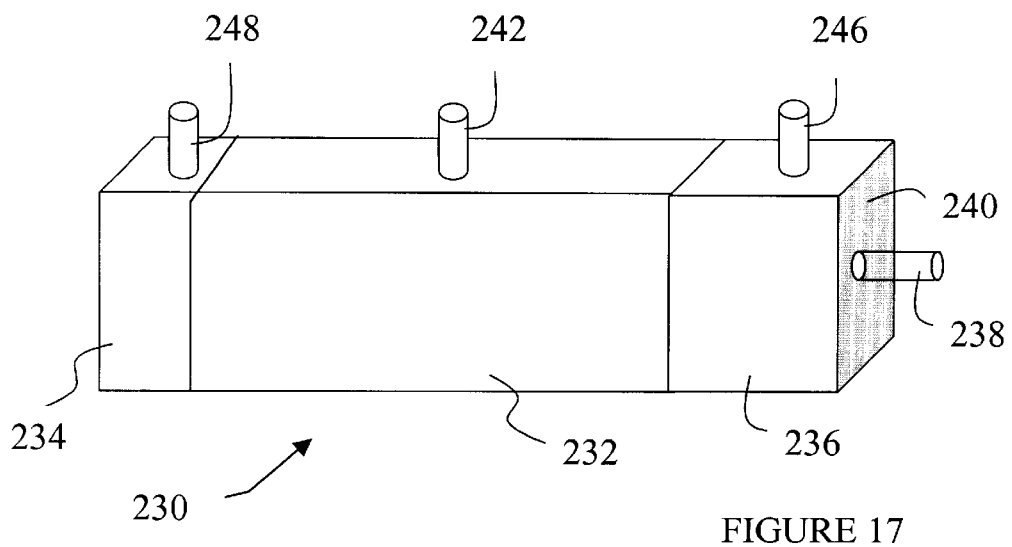
FIG. 17 shows a vessel with fibers laid on both sides of the perforated feed duct.

FIG. 17 shows a corresponding vessel 230 when fibers are laid on both sides of the perforated feed duct 238. The vessel comprises a central section 232 with an outlet 242 for discharging gas from the shell side of the microcell assembly, end section 234 featuring outlet 248 for exhausting bore-side spent gas and end section 236 with inlet 246 for introducing bore-side gas into the housing. The perforated feed duct is arranged to introduce feed gas into the central section 232 of the housing for flow on the shell side thereof.

Figure 18:
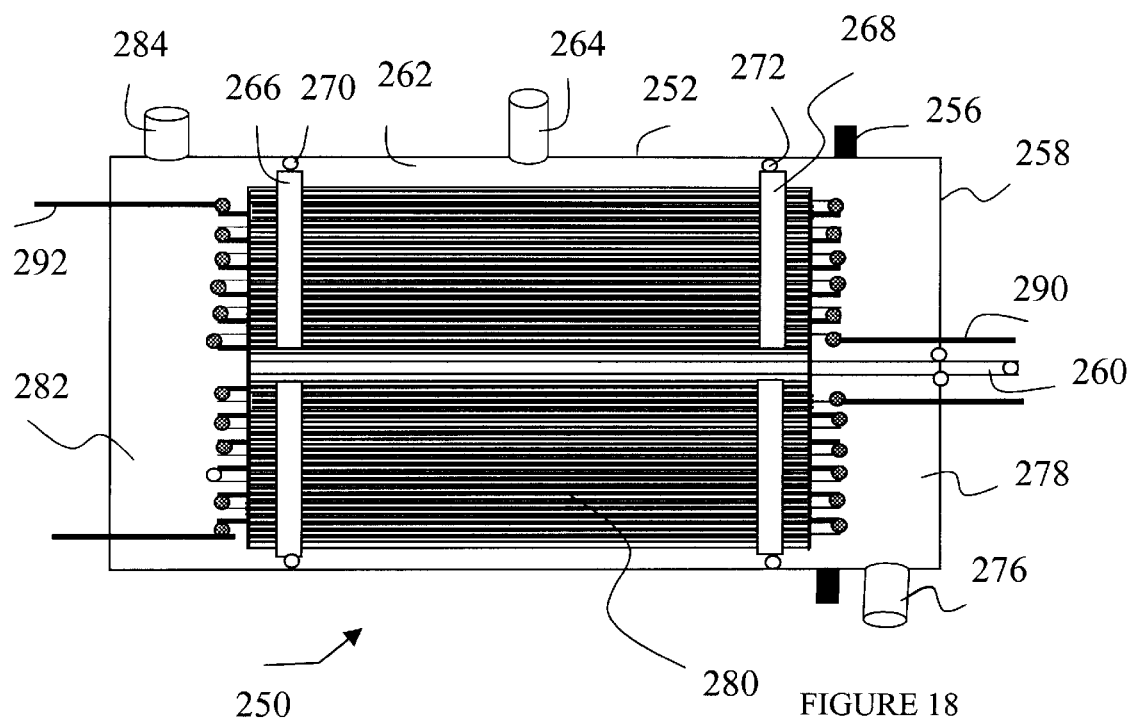
FIG. 18 is a side elevation view of an electrochemical cell device comprising an assembly of microcells.

FIG. 18 is a sectional elevation view of system 250 including a microcell bundle 280 potted at respective ends thereof by potting members 266 and 268, which are leak-tightly secured to the inner surface of the housing 252 by O-ring elements 270 and 272.

The housing 252 has a flange element 256 joining the end section 258 of the housing with the central section. The central section of the housing contains interior volume 252, which is separated from end volume 278 by potting member 268 and from end volume 282 by potting member 266. Feed inlet 276 communicates with end volume 278 and end volume 282 communicates with spent gas outlet 284.

Spent gas outlet 264 communicates with the interior volume 262. Feed tube 260 extends into the center of the microcell bundle 280 in the interior volume 262, and is perforate along its length to introduce feed gas to the shell side of the microcell bundle 280 in the interior volume, with the spent gas being discharged in outlet 264. Feed introduced into end volume 278 from inlet 276 flows through the bore side of the microcell elements in the bundle 280, and flows out of the bundle into end volume 282, following which it is discharged from the housing 252 in outlet 284.

The current collectors are joined to terminal 292 in the end volume 282, with the terminal structure extending exteriorly of the housing 252. At the opposite end volume 278, the other ones of the inner and outer current collectors are joined to terminal 290, which extends exteriorly of the housing.

FIG. 19 shows a perforated feed tube 300 with open ends 302, having perforations 308 along a central part 306 of its length.

FIG. 20 shows fibrous microcell and shell side current collector sheets 312, 314 that can be rolled or wound around the perforated tube 300 of FIG. 19, with the sheets being shown during rolling in FIG. 21 and as finally rolled into shape in FIG. 22.

The sheets will be placed on top of each other such that the ends of the fibrous microcell sheet 312 extend farther than the shell side current collector sheet 314 on one side, and the shell side current collector sheet 314 extends farther on the other side. The sheets 312, 314 then are wrapped tightly around the perforated tube 300 and then potted by potting members 322 and 324.

Figure 23:
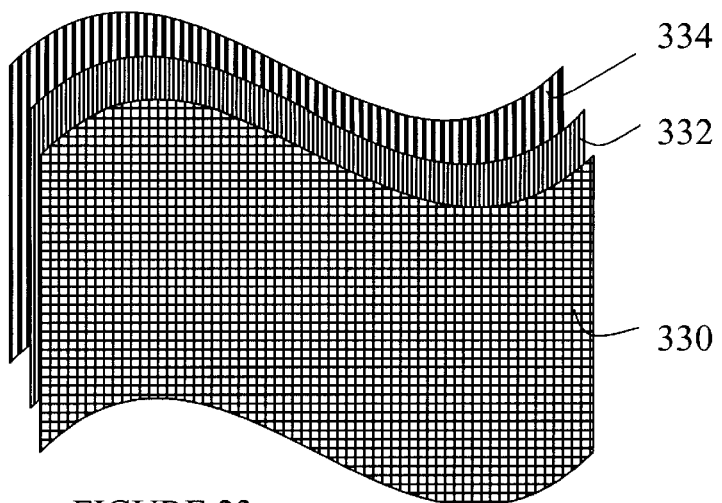
FIG. 23 shows sheets of fibrous microcell elements and shell side current collectors, and an insulating sheet (e.g., of fiberglass or porous plastic material).
Figure 24:
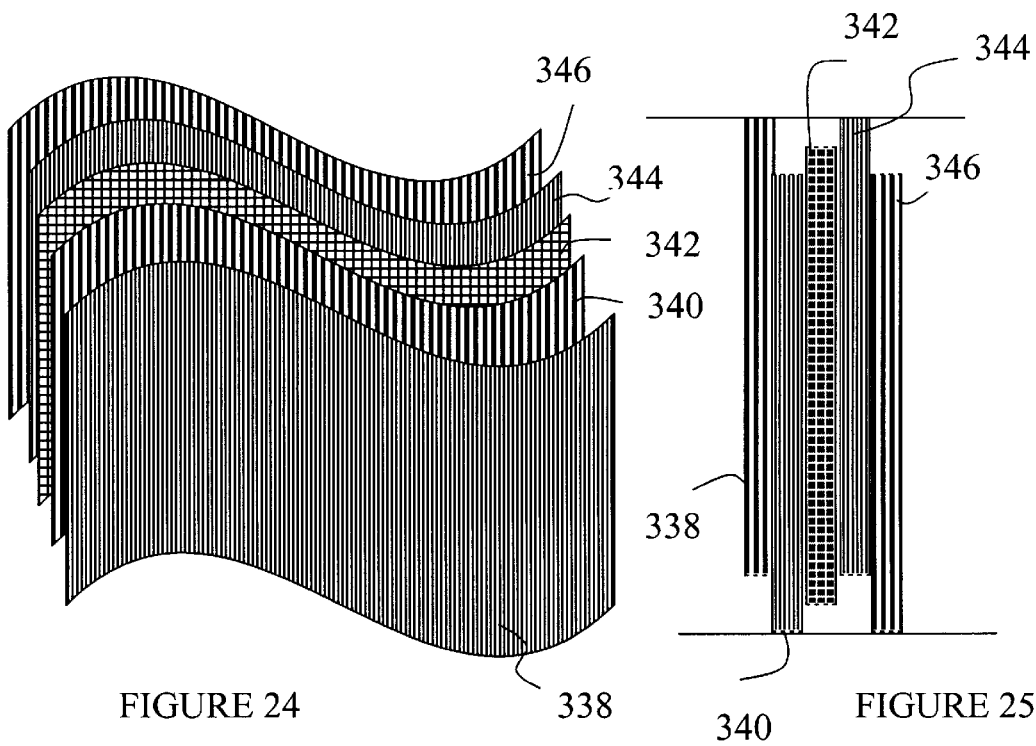
FIG. 24 is a perspective view of a sheet assembly including two sheets of fibrous microcell elements and shell side current collectors.

FIG. 23 shows sheets 332, 334 of fibrous microcells and shell side current collectors, and an insulating sheet 330 (e.g., of fiberglass or porous plastic material). FIG. 24 is a perspective view of a sheet assembly 338, 340, 342, 344 and 346, including two sheets of fibrous microcells and shell side current collectors.

Figure 25:
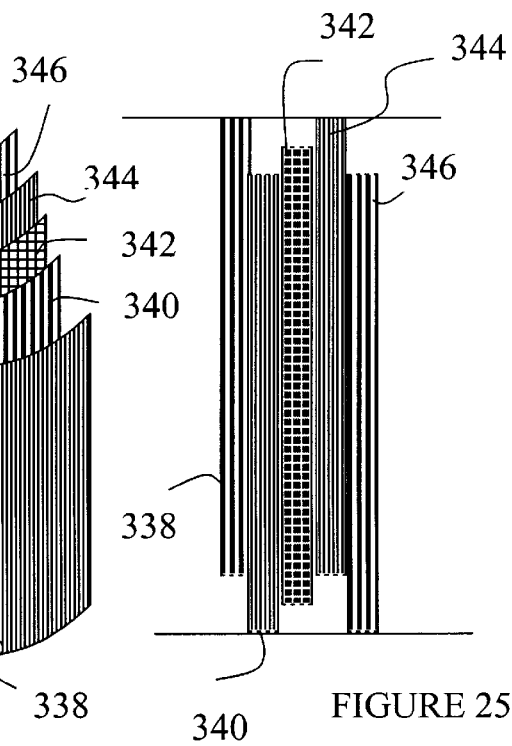
FIG. 25 is a side elevation view of a microcell assembly with off-set fiber layer sheets.

FIG. 25 is a side elevation view of a microcell assembly 338, 340, 342, 344 and 346 with off-set fiber layers. The electrically insulating sheet is placed between two layers of fibers forming a cell. If the sheets on either side of the insulator are extended beyond the edge of the insulator as shown in FIG. 25, then the fiber layers can be connected to one another in series.

Figure 26:
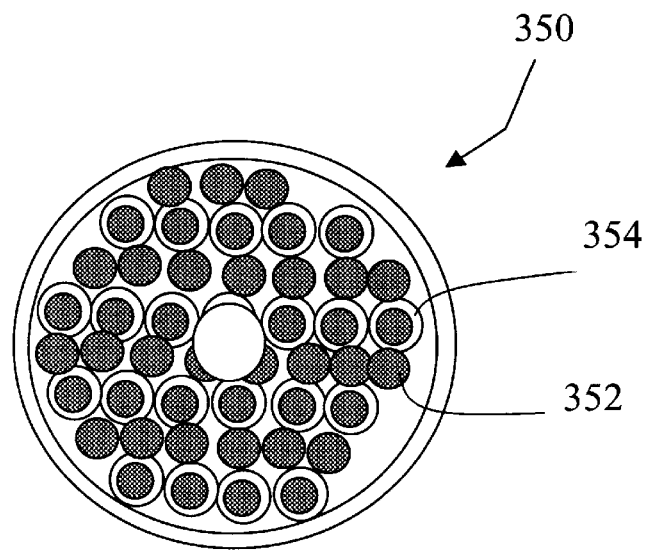
FIG. 26 is a cross-sectional view of a microcell bundle.

FIG. 26 is a cross-sectional view of a microcell bundle 350 comprising an assembly of positive electrodes 354 interspersed with negative electrodes 352 in a bundled conformation.

Figure 27:
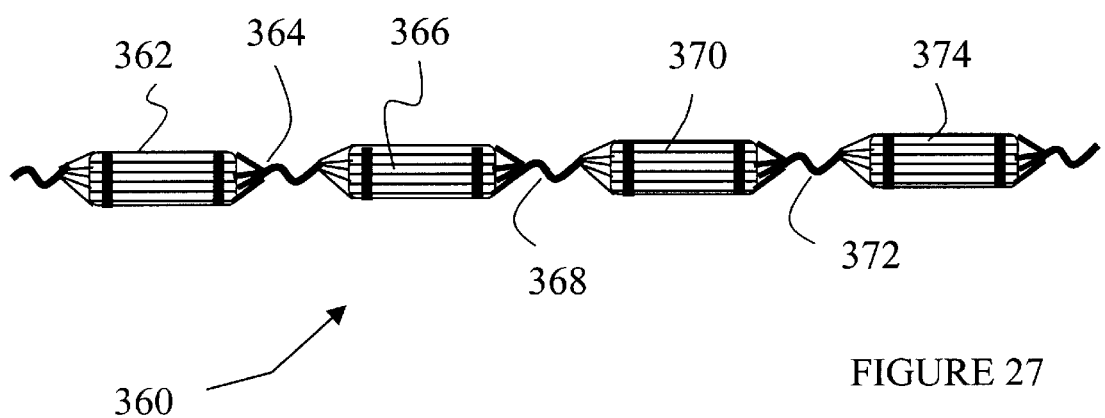
FIG. 27 is a side elevation view of series-connected microcell sub-bundles according to one embodiment of the invention.

FIG. 27 is a side elevation view of series-connected microcell sub-bundles 360 including sub-bundles 362, 366, 370 and 374 interconnected by connectors 364, 368 and 372, respectively. The connectors are desirably highly flexible and most preferably omnidirectionally flexible to accommodate accordion folding of the chain of sub-bundles, so that when folded back against a preceding sub-bundle or folded forwardly against the succeeding sub-bundle.

Figure 28:
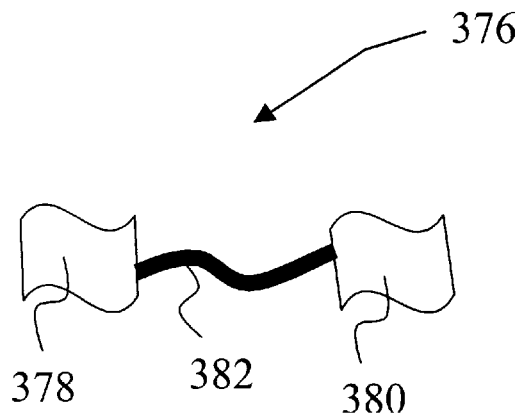
FIG. 28 is a perspective view of a connector that may be used to join component microcell sub-bundles in series.

FIG. 28 is a perspective view of a connector 376 that may be used to join component microcell sub-bundles in series. The connector 376 comprises a spaced-apart pair of crimpable leaves 378, 380, each of which is crimpable by means of a pliers or similar tool, to compressively grip a protruberant group of current collectors of a sub-bundle. The, leaves are electrically conductive, and are themselves interconnected by a flexible yoke element 382, which may comprise wire or metal filament, etc. that serves to electrically interconnect the respective sub-bundles with which leaves 378 and 380 are coupled.

Figure 29:
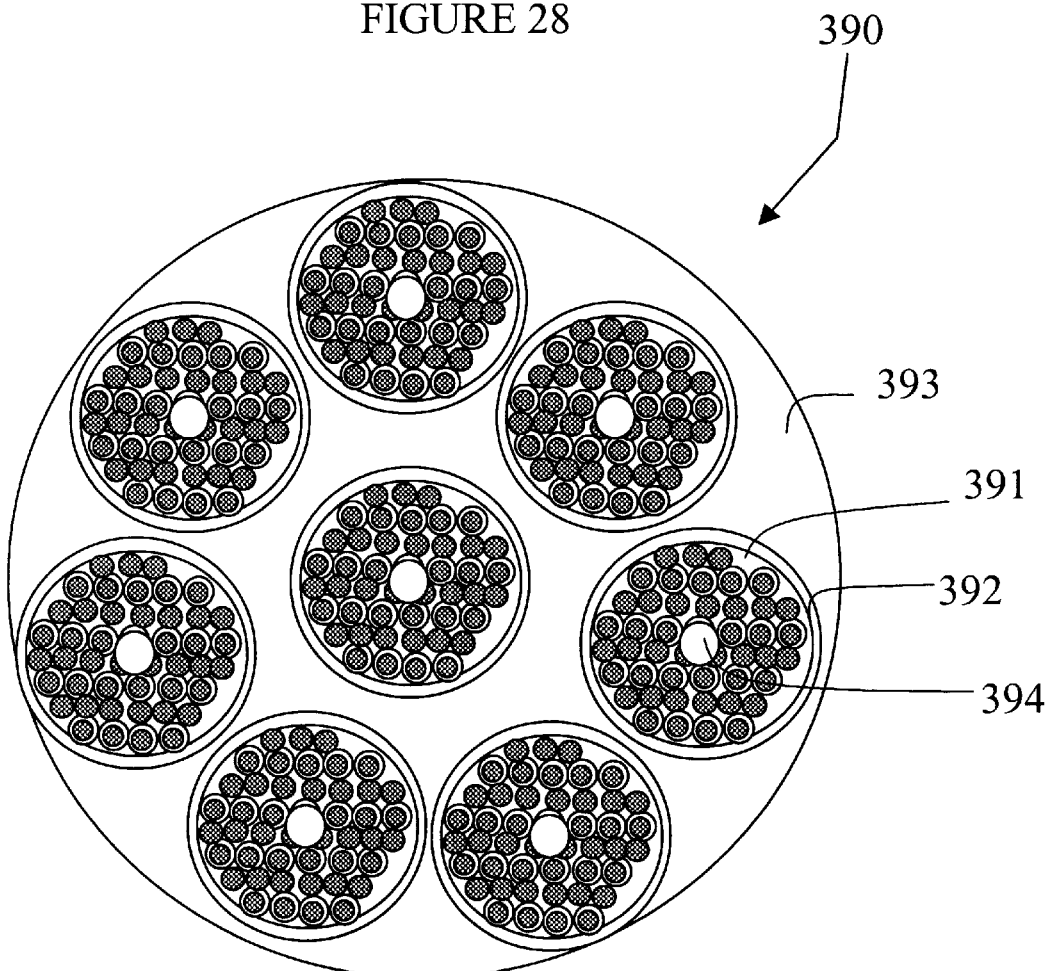
FIG. 29 is a cross-sectional elevation view of a multi-bundle assembly, wherein each bundle has a corresponding feed tube associated therewith.

FIG. 29 is a cross-sectional elevation view of a multi-bundle assembly 390, wherein each bundle 391 has a corresponding feed tube 394 associated therewith, and is mounted in a tubesheet 393 and leak-tightly sealed therein with an O-ring sealant element 392.

Figure 30:
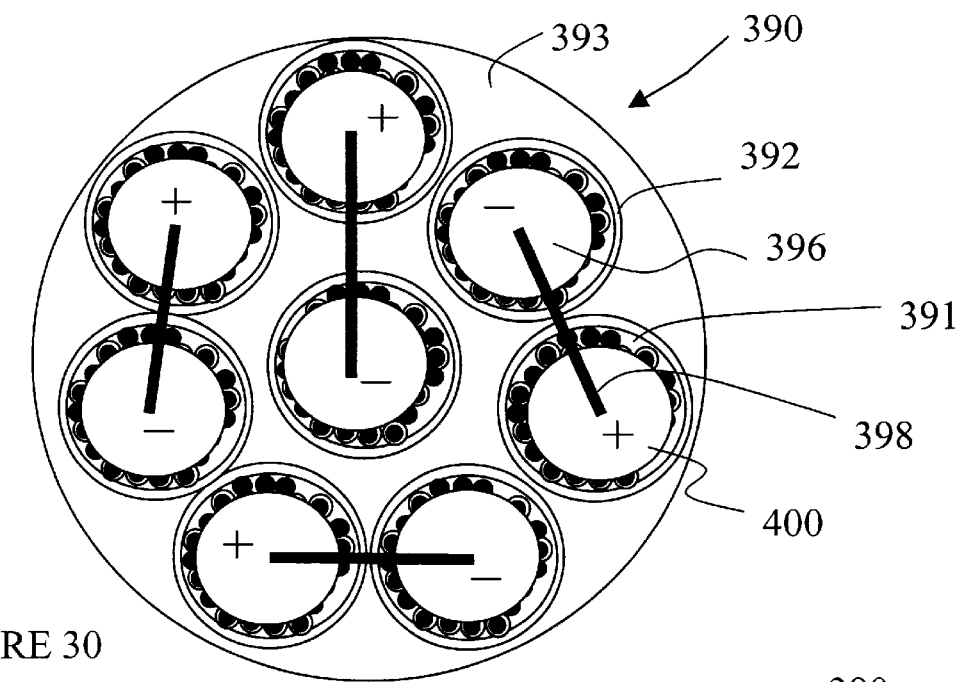
FIG. 30 is a cross-sectional elevation view of a multi-bundle assembly, wherein the respective bundles are connected in series.

FIG. 30 is a cross-sectional elevation view of the multi-bundle assembly of FIG. 29, wherein the respective bundles are connected in series and are numbered correspondingly to FIG. 29. The respective adjacent bundles are interconnected by terminal elements 396 and 400 joined to one another by coupling wire 398 in series arrangement.

Figure 31:
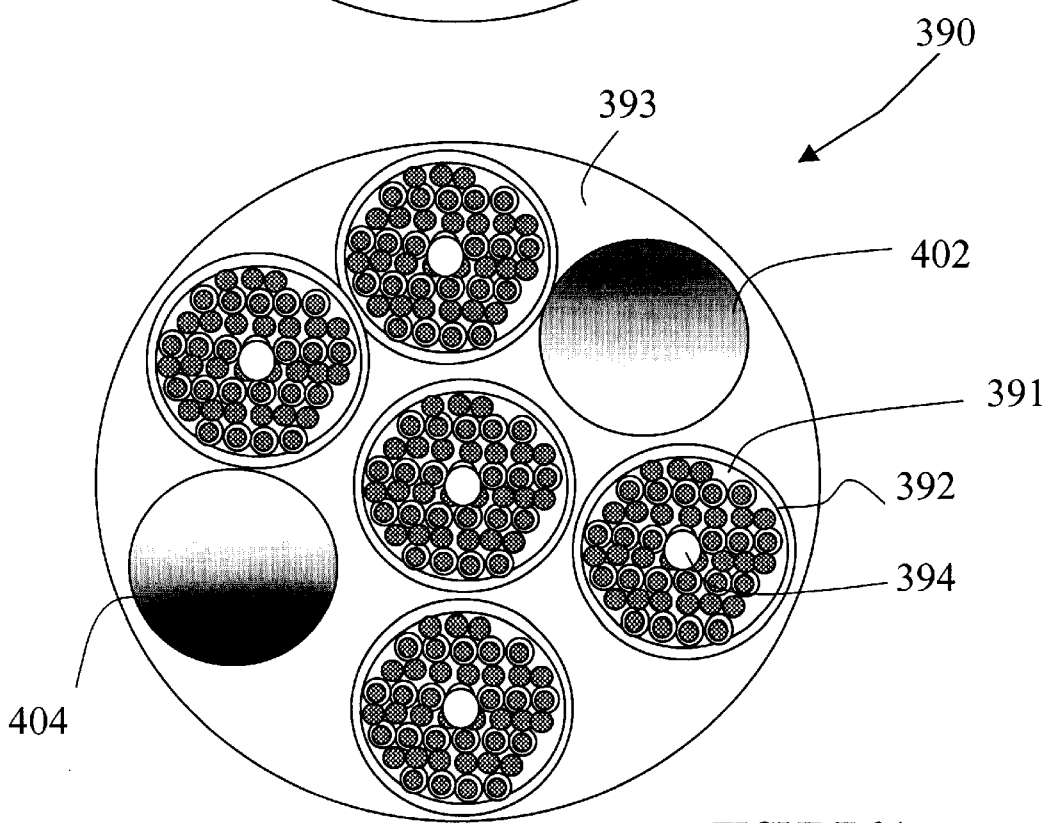
FIG. 31 is a cross-sectional view of a fuel cell module with multiple sub-bundles wherein blank seal elements provide closure members for the face sheet of the module enclosure.

FIG. 31 is a cross-sectional view of a fuel cell module with multiple sub-bundles, numbered correspondingly to FIG. 29, and wherein blank seal elements 402 and 404 provide closure members for the tubesheet 393 of the module enclosure, when sub-bundles are removed.

Figure 32:
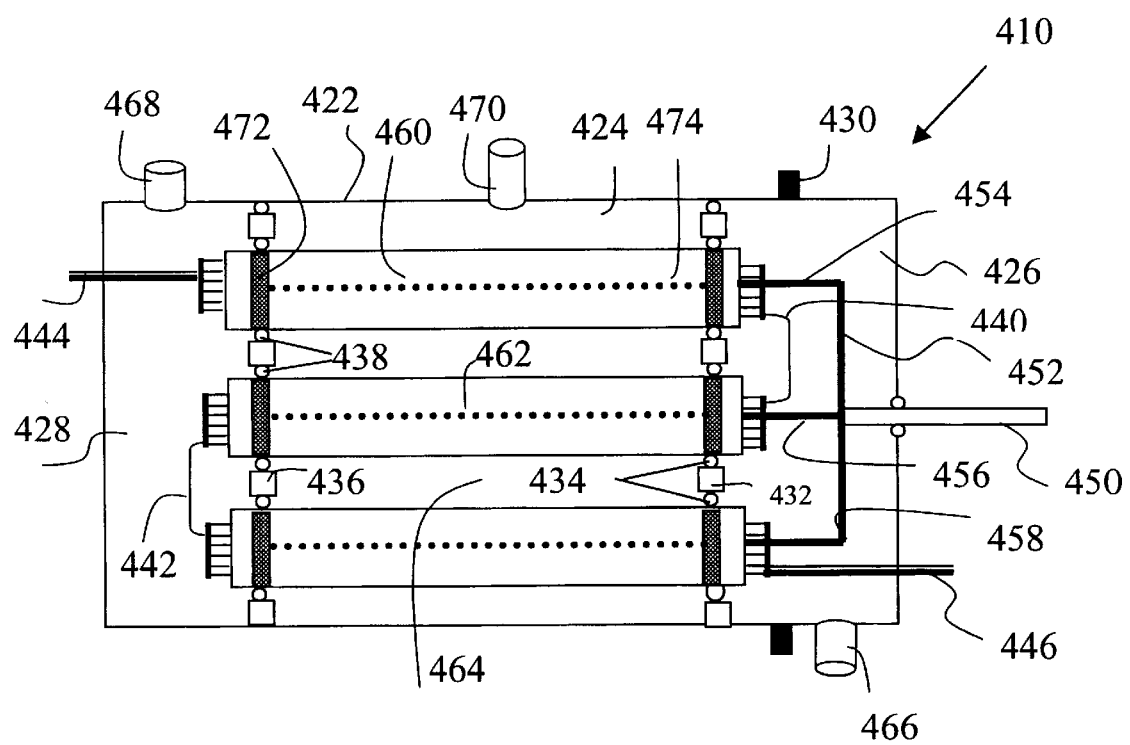
FIG. 32 is a side view of a fuel cell module with multiple sub-bundles of microcell elements, with a feed tube in a manifolded arrangement.

FIG. 32 is a side view of a fuel cell module 410 with multiple sub-bundles 460, 462 and 464 of microcell elements, with a feed tube 450 in a manifolded arrangement. The module includes a housing 422 enclosing a central interior volume 424 bounded by the housing wall of the module and by tubesheets 472, to which the sub-bundles are leak-tightly secured by means of O-ring elements 438, and 474, to which the sub-bundles are leak-tightly secured by means of O-ring elements 434.

The end sections of the housing enclose respective end volumes 426 and 428. The end volume 426 contains a manifold to which the feed tube 450 is joined in gas flow communication, for introduction of feed gas to each of the three sub-bundles 460, 462 and 464 by means of the manifold line 452 in communication with branch lines 454, 456 and 458 coupled to the respective sub-bundles.

The sub-bundles are joined in series relationship to one another in sequence, by connection line 440 interconnecting sub-bundles 460 and 462 and connection line 442 interconnecting sub-bundles 462 and 464. The exterior sub-bundles in such series are in turn joined respectively with terminals 444 and 446, as shown.

The right-hand end section of the housing is flangedly connected to the main central section of the housing by flange 430, with which mechanical fastener means may be coupled to leak-tightly secure the component sections of the housing to one another.

The housing is provided with a feed inlet 466 for introducing one of the fuel and oxidant streams into the end volume 426 for flow through the sub-bundles on the bore side thereof.

An outlet 468 is joined to the housing 422 at the left-hand section as shown, for discharge of spent feed gas from the end volume of the housing.

The spent gas outlet 470 is provided in the main central section of the housing, for discharge of spent feed from the shell side of the sub-bundle in the interior volume 424 of the housing.

Figure 33:
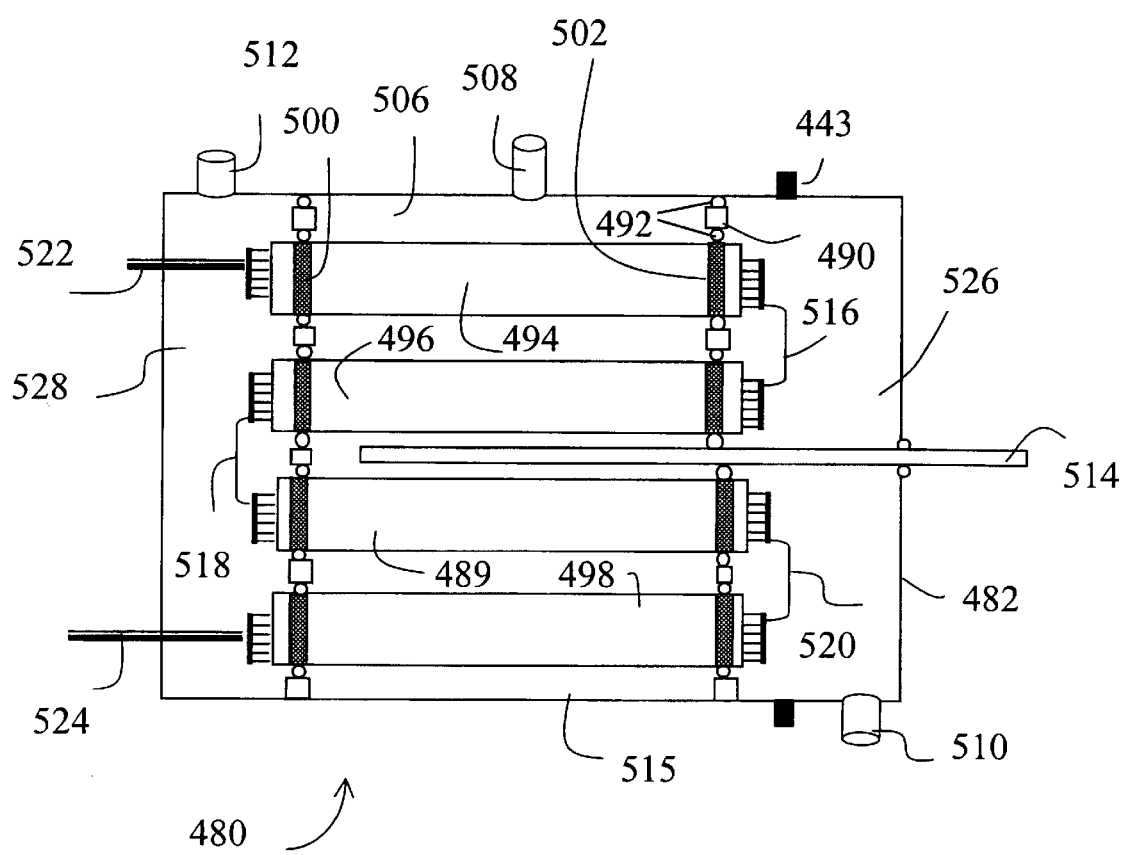
FIG. 33 is a side elevation view in section, showing penetration of a feed tube into the interior volume of the housing of a module containing microcell sub-bundles according to one embodiment of the present invention.

FIG. 33 is a side elevation view in section, showing penetration of a feed tube 514 into the interior volume 506 of the housing 515 of a module 480 containing microcell sub-bundles 494, 496, 489 and 498. In this arrangement, the sub-bundles are mounted in correspondingly sized receiving openings in tubesheets 500 and 502, leak-tightly secured in the housing by means of O-ring sealing elements 492. In this way, the internal volume of the housing is divided into a central volume 506 and end volumes 526 and 528.

The housing is provided with feed gas inlet 510, spent gas outlet 508 and spent gas outlet 512. Spent gas on the shell side of the sub-bundle is discharged from the housing in outlet 508, and feed gas introduced in inlet 510 is flowed through the bore side of the sub-bundle and discharged into end volume 528. From end volume 528 bore side spent gas is discharged from the housing in outlet 512.

The sub-bundles in the interior volume of housing 515 are joined in series relationship to one another by means of series connector lines 516, 518 and 520, and the outside sub-bundles in the series arrangement are in turn joined to terminals 522 and 524.

The housing 515 is openable at flange 443 to remove the right-hand end section, following which the respective sub-bundles can be accessed for repair or replacement.

Thus, microcell articles in accordance with the present invention may be readily connected in series with one another, with successive adjacent articles (fibrous microcell sheet layers, sub-bundles) being insulated from each other by sheets or sheathing of porous insulating electrically non-conductive material, or in other manner ensuring the absence of electrical interference between such adjacent microcell articles. It will be appreciated by those skilled in the art that the numbers of sub-bundles shown in FIGS. 32 and 33, are illustrative only, and that the number of sub-bundles in a given application of the invention may be widely varied depending on the energy generation requirements and other structural and operational parameters of the system in specific embodiments.

In the fabrication of high voltage electrochemical cells utilizing microcell articles of the invention, a bundle or sheet-form assembly of microcells is fabricated. For example, if a design current of 200 amps is required, a number of fibrous microcell articles are connected in parallel to generate the necessary current. The resultant microcell structure then is either bundled in a cylindrical shape or used to form a multi-layered assembly. In a bundle, the positive and negative fibrous elements must be electrically insulated yet in intimate contact with each other. To achieve higher voltages, the sheets or bundles are connected in series, i.e., the positive of one cell is connected to the negative of the next adjacent cell. The cells, bundles or sheets connected in series with one another are then potted and sealed in the same housing to provide the desired high voltage electrochemical cell module.

Thermal Management

When microcell elements are bundled or otherwise aggregated in a compact structural configuration to form modular electrochemical cell assemblies, the resulting electrochemical energy generation or energy conversion device generates significant heat in its operation.

Various methods can be utilized in accordance with the present invention to remove heat from the microcell assembly.

In one aspect of the invention, heat exchange tubes are distributed in the microcell bundles, sub-bundles, or other aggregated microcell assembly. In a preferred embodiment, such heat exchange tubes are aligned parallel with the fibrous microcell elements in the microcell assembly.

In another embodiment heat exchange tubes are placed between sub-bundles in the assembly, so that the heat exchange tubes extend at least from one end of a tubesheet face (in which the extremeties or outer portions of the sub-bundles are mounted) to the opposite end. The number, size, and material of the heat exchange tubes are readily determined based on the amount of heat that must be recovered, the fuel cell operating temperature, the type of heat exchange fluid used, and the pumping requirement or flow rate of the fluid, as will be appreciated by those skilled in the art.

In order to maintain separation of the heat exchange fluid from the feed that is flowed to the bore side of the microcell fibers in the fuel cell-module, the length of the heat exchange tubes can be selected such that the heat exchange tubes extend beyond the tube sheet that seals the bore side of the microcell hollow fibers from the shell side. The extended heat exchange tubes then are potted again to form a barrier between the bore of the heat exchange tubes and the bore of the microcell hollow fibers.

The final assembly of the fuel cell module with the heat exchange tubes preferably includes the formation of a first housing with an inlet for the introduction of heat exchange fluid in one end, a second housing between the two potted sections, i.e., the potted heat exchange tubes and the potted microcell elements, with an inlet for introduction of feed to the bore side of the microcell, and with the structure of the housing being correspondingly constructed at the opposite end, to provide corresponding respective outlets for discharge of the heat exchange fluid and the spent feed.

An alternative thermal management design for microcell electrochemical cell modules according to the present invention employs hollow, nonporous, electrically and thermally conductive tubes, as current collectors for either the bore side or the shell side or both the shell and bore side of the microcell structures. Since the current collectors terminate at opposite ends of each tube sheet, the heat exchange current collector tube will be potted as described hereinabove, to separate the heat exchange fluid housing from the bore side/feed only at one end. At the opposite end the heat exchange tube is terminated at the tube sheet.

This arrangement allows the heat exchange fluid and feed to the bore to be mixed at the outlet. In this system design the heat exchange fluid does not enter the bore of the microcell to contact the catalyst or the electrolyte. For example, the feed to the bore and the heat exchange fluid can be supplied to the module in the same direction, such that the heat exchange fluid and the feed to the bore can only mix at the feed outlet from the microcells.

The heat exchange fluid then is recovered in a separate unit, or a plenum in the housing can be provided to collect the heat exchange fluid for recycle. The separation of heat exchange fluid from the feed can be readily achieved, e.g., in the case where the feed is air or hydrogen gas.

In a specific embodiment, where the heat exchange fluid and the feed to the bore are the same (for example, air), the heat exchange fluid and the feed can be allowed to mix without further separation requirement.

In a further embodiment, heat is removed from the microcell module by conduction of heat from the current collectors on the shell side or bore side of the microcell elements. In this approach, the ends of the current collectors are extended and immersed in a heat exchange fluid in a plenum inside the housing containing the microcell module or in a heat exchange passage located within the housing, at the feed inlet to or outlet from the fiber bores. In the latter case, the inlet and outlet of the heat exchange passage are leak-tightly segregated from the interior volume of the microcell module.

Figure 34:
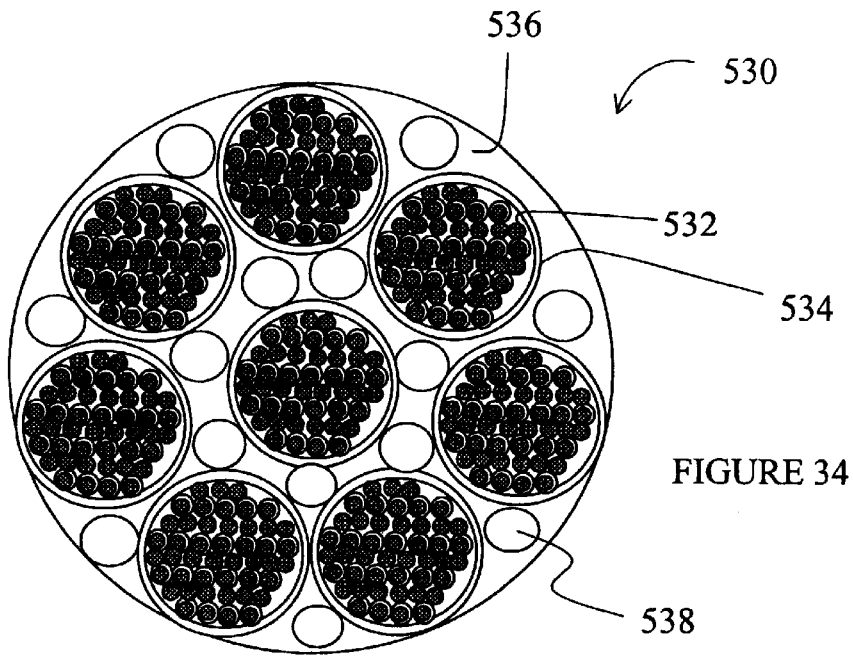
FIG. 34 is a cross-sectional view of a microcell assembly in which heat exchange fibers or tubes are provided in interspersed relationship to the microcell bundles.

Referring to the drawings, FIG. 34 is a cross-sectional view of a microcell assembly 530 in which heat exchange fibers or tubes 538 are provided in interspersed (distributed) relationship to the microcell bundles 532, as shown.

In the illustrated microcell assembly, each microcell bundle is mounted in a correspondingly sized opening in a tubesheet 536, with the microcell bundle being leak-tightly sealed in such opening by means of an O-ring sealing element. Alternatively, the microcell bundles 532 and heat exchange tubes 538 are potted to form tube sheet 536.

Figure 35:
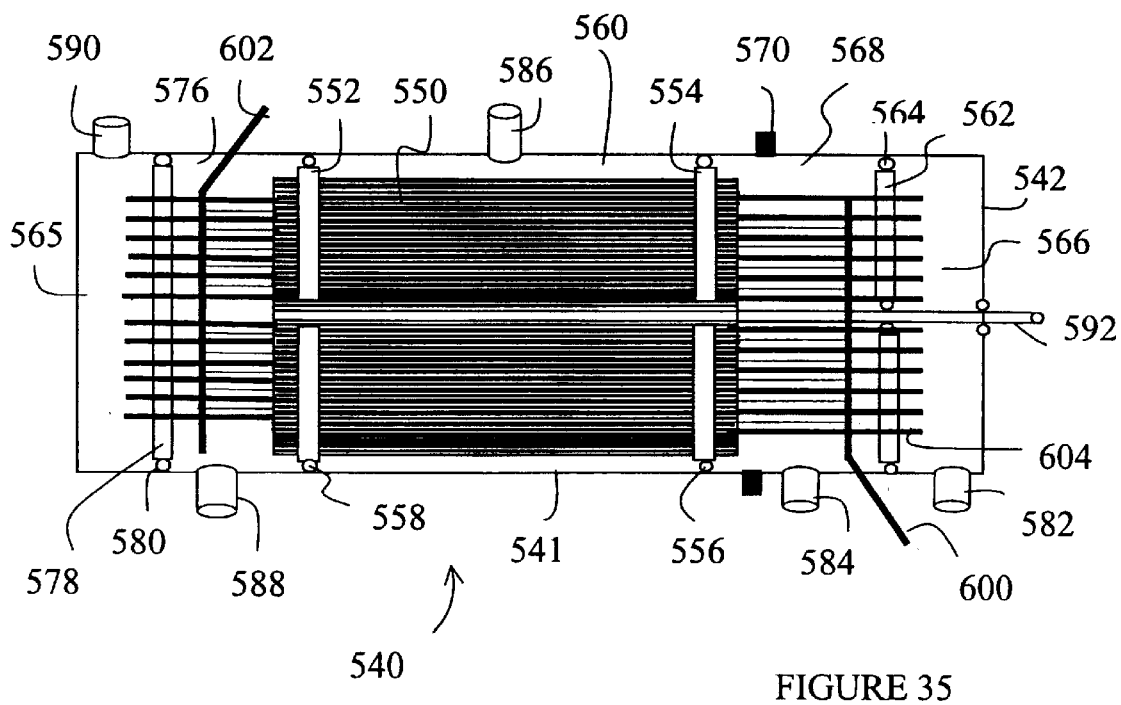
FIG. 35 is a cross-sectional elevation view of a fuel cell module, showing air/fuel passages and heat exchange passages, interspersed between the sub-bundles.

FIG. 35 is a sectional elevation view of a fuel cell module, showing air/fuel passages and heat exchange passages thereof.

The fuel cell module 540 comprises a housing 541 in which a microcell assembly 550 is mounted, by means of potting members 552 and 554, which are circumferentially sealingly engaged with the inner wall of the housing by means of O-ring sealing elements 556 and 558. In this manner, there is formed an interior volume 560 in the housing, bounded by the potting members 552 and 554. A gas discharge outlet 586 is provided in the main central portion of the housing, in gas flow communication with the shell side of the microcell elements in the assembly 550.

The fuel cell module of FIG. 35 also features respective tubesheets 562, sealingly engaged with the inner wall of the housing 541 by means of O-ring sealing element, and tubesheet 578, sealingly engaged with the inner wall of the housing by means of O-ring sealing element 580.

By such arrangement, an intermediate volume 576 is provided between the potting 552 and tubesheet 578, and an end volume is provided at the extremity of the housing, in the left-hand portion in the view shown.

Correspondingly, an intermediate volume 568 is formed between the potting member 554 and the tubesheet 562, as well as an end volume at the right-hand end portion of the housing in the view shown in FIG. 35.

Coolant inlet 582 is provided at the right-hand end volume portion of the fuel cell module housing, and a coolant outlet 590 is provided at the left-hand end portion of such housing.

A feed inlet 584 is provided in communication with the intermediate volume 568 of the module and a spent feed outlet 588 is provided in flow communication with the intermediate volume 576 at the opposite end of the module.

Distributed across (transverse to the longitudinal axis) cross-section of the microcell assembly 550 is a plurality of hollow fiber heat exchange passages 604, which extend through the entire length of the microcell assembly and intermediate volumes through the tubesheets 562 and 578 into the end volumes 566 and 565, respectively.

A central feed tube 592 enters the vessel from the right-hand side thereof and extends centrally into the microcell assembly 550. Within the microcell assembly, the feed tube is of a perforate character, to provide feed to the shell side of the fibrous microcell elements in the microcell assembly.

Current collector elements in the respective intermediate volumes 568 and 576 engage respective terminals 600 and 602, which extend exteriorly of the housing 541.

The housing 541 is provided with a flange 570 connection, secured by suitable mechanical fasteners, whereby the right-hand intermediate volume and end volume portion of the housing is removable to access the interior elements of the fuel cell module.

In operation, the coolant medium (from an external source, not shown in FIG. 35) is flowed into the end volume 566 and passes through the open-ended heat exchange tubes 604 and flows axially through such tubes to the opposite end volume 565, from which the coolant is discharged through outlet 590, and may for example be subjected to heat recovery for re-circulation of coolant to the inlet 582 in a continuous loop fashion. Concurrently, feed (oxidant and fuel) are introduced to respective shell side and bore side of microcell elements in the microcell assembly 550 to effect electrochemical reaction generating power transmitted to an external load through the respective terminals 600 and 602, which are joined to appropriate circuitry and external load componentry, for such purpose.

Figure 36:
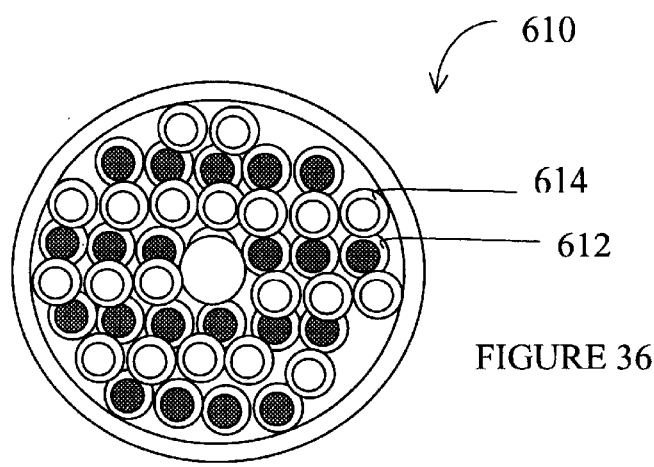
FIG. 36 is a cross-sectional view of a microcell bundle wherein hollow fibers function as outer electrode elements and enable heat exchange.

FIG. 36 is a cross-sectional view of a microcell bundle 610 incorporating hollow fibers 614 interspersed with fibrous microcell elements 612. In such bundle, the hollow fibers function as outer electrode elements, as well as enabling heat exchange. Accordingly, the hollow fibers may be coated, impregnated or extruded with electrocatalyst material or otherwise configured for functional use as electrode elements, in addition to providing a throughbore passage in the lumen thereof, for flow of a heat transfer medium, e.g., air, there through, to effect heat removal from the bundle, incident to electrochemical reaction heat generation in the operation of the microcell assembly.

Figure 37:
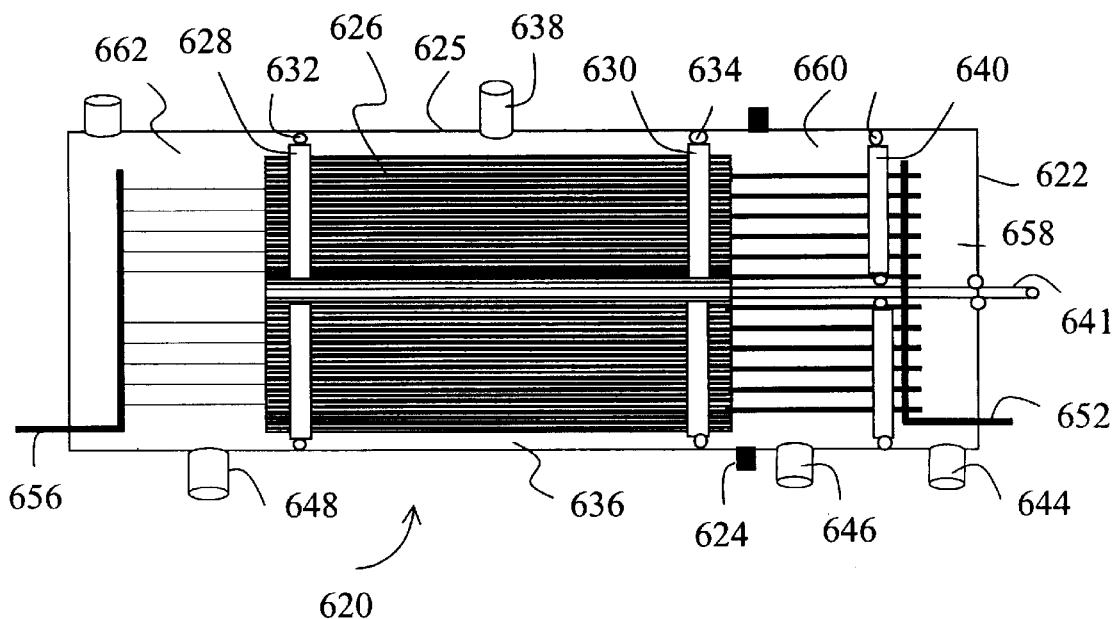
FIG. 37 is a side elevation in cross section of a fuel cell with heat exchange/current collector hollow fibers.

FIG. 37 is a side elevation in section of a fuel cell module utilizing hollow fiber heat exchange elements.

The fuel cell module 620 of FIG. 37 comprises a housing 625, which is flanged with flange structure 624, to allow separation of the right-hand portion of the housing to be removed from the main central portion, to access internal structures of the module. The housing 625 contains a microcell bundle 626 which is potted by potting numbers 628 and 630, and leak-tightly sealed against the interior wall surface of the housing 625, by O-ring sealing elements 632 and 634, to define an interior volume 636 within the housing bounded by the interior walls and respective potting members 628 and 630.

In axially spaced relationship to the potting number 630 is a tubesheet 640, thereby defining an intermediate volume 660, which is sealed by O-ring element 642 against the interior wall of the housing.

The heat exchange tubes constituting current collectors, terminate at tube sheet 628, with heat exchange/current collector tubes communicating with end volume 662 of housing 622.

Exterior of the tubesheet 640 within the housing is an end volume 658.

A central feed tube 641 extends through the end-wall 622 of the housing and is centrally extended in to the microcell assembly 626. Such central feed tube is perforate within the microcell assembly, to provide fuel to the shell side of the assembly.

The right-hand portion of the housing is removable at flange 624 to provide access to the interior elements of the module.

The intermediate volume 660 is provided with an inlet 646 for introduction of fuel thereto for flow through assembly 626 to volume 662, the latter being provided with outlet 648 for discharge of spent fuel therefrom.

The intermediate volume 636 of the housing is provided with outlet 638 for discharge of shell side spent feed.

The end volume 658 of the module is provided with inlet 644 for introduction of coolant for flow through hollow fiber elements extending in to such volume, for axial flow through the hollow fiber electrode elements to the opposite end volume 662.

The hollow fiber heat exchange passages in this embodiment are formed by hollow fiber electrodes, and such electrodes are coupled in the respective end volumes to the corresponding terminals 652 and 656, as illustrated.

Figure 38:
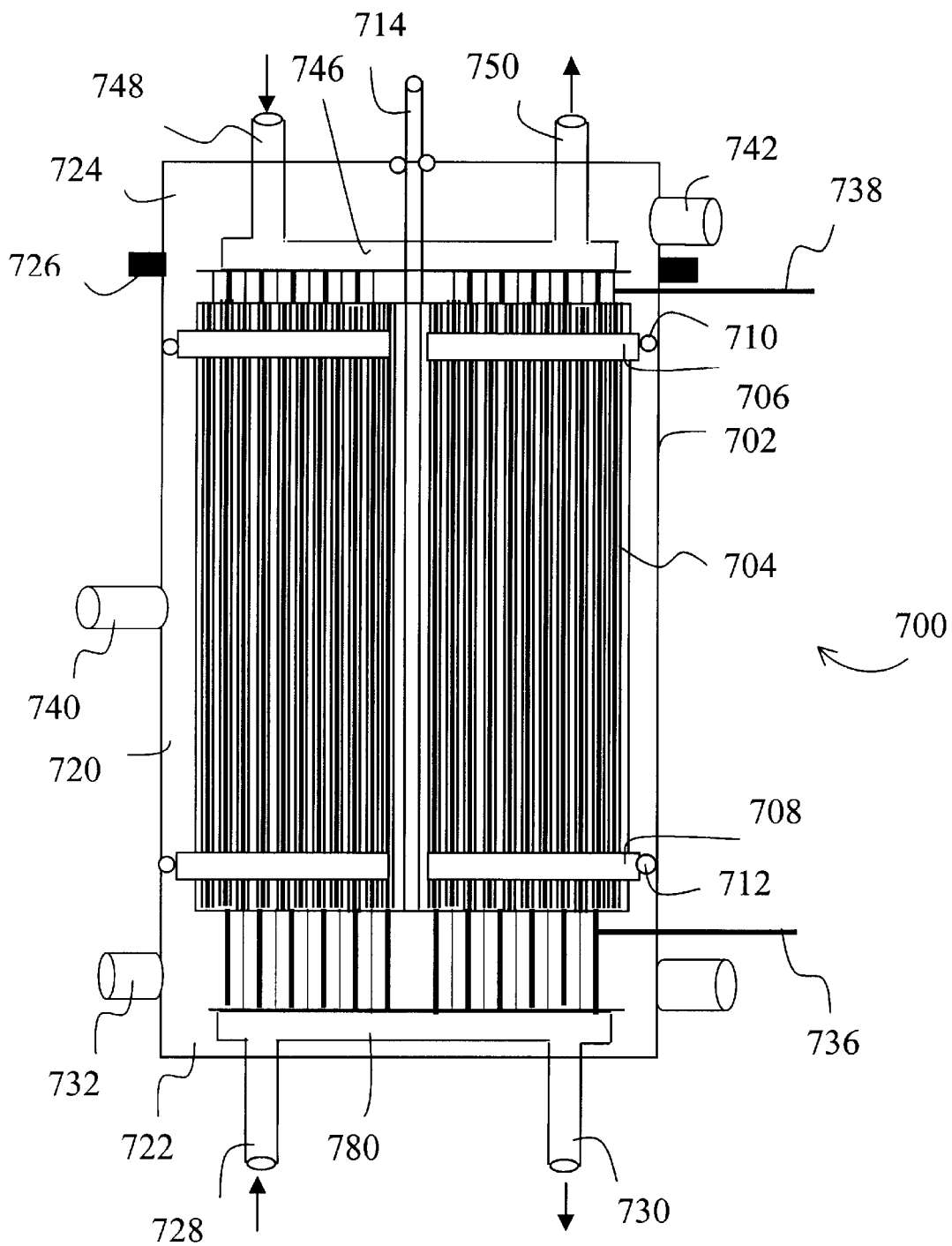
FIG. 38 is a cross-sectional elevation view of a fuel cell module with heat exchange from current collectors by means of conduction.

FIG. 38 is a sectional elevation view of a fuel cell module with heat exchange from current collectors by means of conduction. The module 700 includes a housing 702 containing microcell assembly 704, potted by respective potting numbers 706, sealed by O-ring sealing element 710, and potting number 708, sealed by O-ring sealing element 712. An interior volume 720 is thereby defined, communicating with the outlet 740 for discharge of spent feed from the interior volume 720.

A central feed tube 714 extends centrally in to the microcell assembly 704 and is perforate over its length within the microcell assembly, to provide feed to the shell side of the assembly.

The end volume 724 of the housing 702 is provided with an inlet 742 for introduction of feed for flow through bore passages of the microcell assembly 704 to the end volume 722 from which spent feed can be discharged from outlets 732.

In this module, a heat exchanger 746 is contained in end volume 724 and joined in heat exchange contact with current collector elements of the microcell assembly. A heat exchange fluid (from a source not shown in FIG. 38) is introduced to heat exchange or inlet 748 and circulated there through for discharge from outlet 750.

In like manner, the opposite end volume 722 contains a heat exchanger 780 with an inlet 728 receiving heat exchange fluid for flow there through and discharge from the second heat exchanger 780 through outlet 730.

The current collector elements at respective ends are-joined in electrically conductive relationship to terminals 738 and 736. The left-hand portion of the housing 702 is flanged by flange 726, whereby the housing can be readily opened to access internal elements of the housing.

Figure 39:
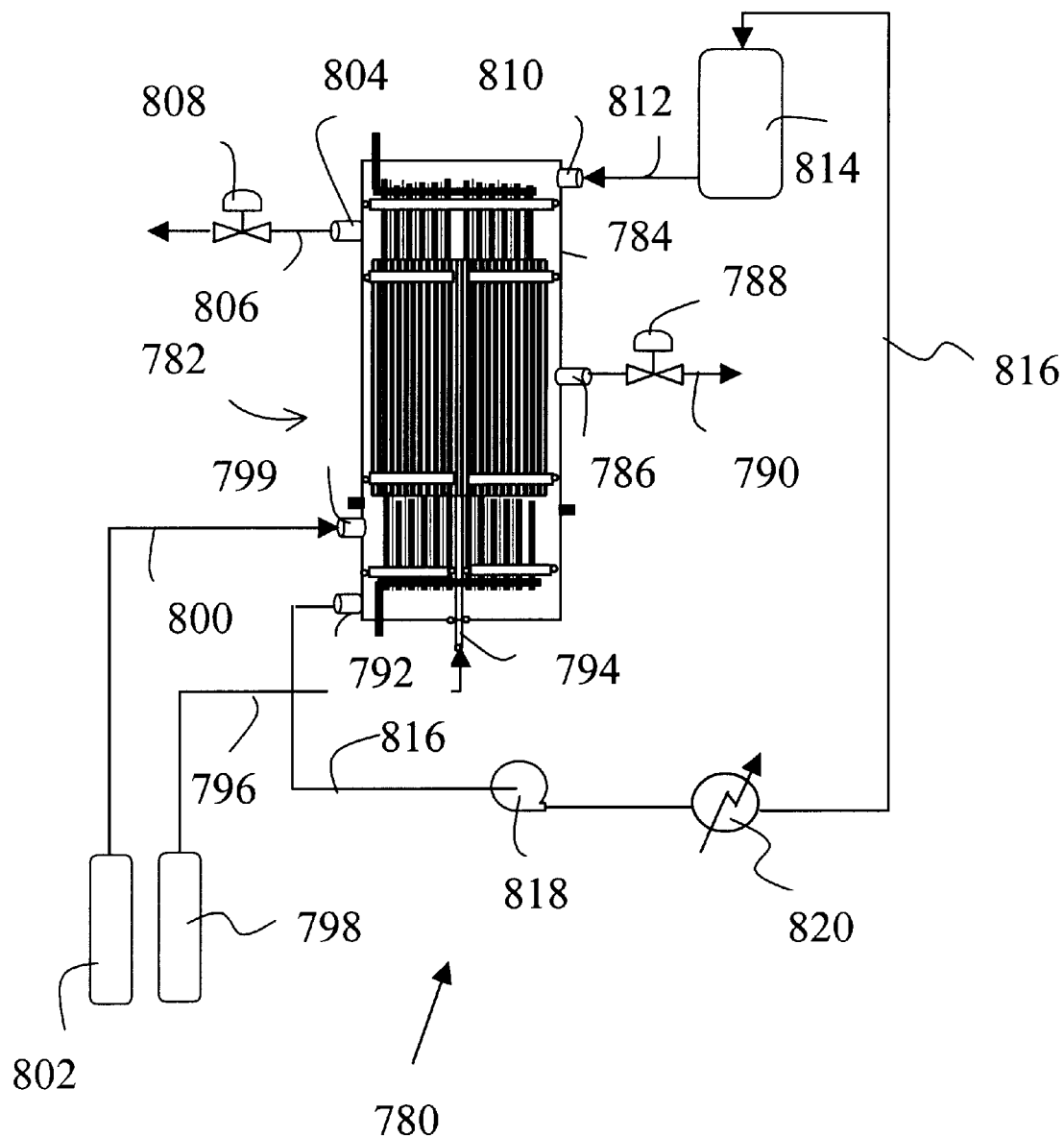
FIG. 39 is a schematic depiction of a fuel cell system, according to one embodiment of the invention.

FIG. 39 is a schematic representation of a fuel cell system, according to one embodiment of the invention.

The fuel cell system 780 includes a microcell module 782, which includes a housing 784 having joined thereto a coolant medium inlet 810, a coolant medium outlet 792, a fuel inlet 794, an oxidant inlet 799, a spent fuel outlet 786 and a spent oxidant outlet 804. The feed outlet 786 is joined to a discharge line containing back pressure regulating valve 788 therein. In like manner, the spent oxidant outlet 804 is joined to discharge line 806 containing back pressure regulating valve 808 therein. The respective back pressure regulating valve 788 and 808 may be modulated to control the rate and extent of electrochemical reaction involving the fuel and oxidant species.

The system includes fuel supply tank 798 joined by fuel feed line 796 to the feed inlet tube 794. Correspondingly, an oxidant tank 802 is provided, joined to oxidant feed line 800 coupled to oxidant inlet 799.

The system involves a coolant recirculation arrangement, including recirculation line 816 joined to coolant outlet 792 and having dispose therein a pump 818 and heat exchanger 820. Heat exchanger 820 effects heat removal from the warmed coolant medium, so that same is recycled to the surge tank 814 for return in feed line 812 to coolant inlet 810.

Accordingly, an operation of the system shown in FIG. 39, the coolant medium is flowed through hollow fiber heat exchange tubes in the housing and is continuously recirculated to the surge tank to provide a hold-up inventory of coolant for high rate electrochemical oxidation.

Double Membrane Microcell Structures and Assemblies

Microcell structures are usefully employed in specific applications of the invention in a double membrane configuration.

In one embodiment, microcell structures of such type are readily formed using an inner hollow fiber separator having an inner current collector and electrocatalyst of the inner electrode on its shell side. Such inner hollow fiber separator is encapsulated by an outer hollow fiber membrane. The pores of the outer hollow fiber membrane are impregnated with an electrolyte and the electrocatalyst of the outer electrode is coated on the shell side of the outer hollow fiber membrane, to form a double membrane microcell structure.

This double membrane microcell structure is advantageous to enable the inner hollow fiber separator to be used as a membrane to selectively allow permeation of feed (e.g., hydrogen or oxygen), as desired. This may be effected, for example, by coating the inner wall or the outer shell of the inner separator with a perm-selective material that preferentially allows the desired gas to permeate to the electrode. This double membrane design thus is advantageous in reducing or eliminating the exposure of the electrocatalyst or the electrolyte to potential poisonous impurities in the feed. Materials that may be used in the perm-selective membrane include cellulose esters, polyimides, polysulfones and palladium.

In another microcell structure including a double membrane separator, the inner wall of the inner separator may be impregnated or coated with a $CO-H_2O$ shift low temperature reforming catalyst. In such design, the shell side of the inner separator is coated with an anode or cathode feed-selective material.

Another double membrane design involves coating both anode and cathode with a hydrogen- or oxygen-selective material. In such instance, the protective perm-selective material on the shell side of the outer hollow fiber membrane must be electrically conductive to allow electrical contact between the current collector of the outer electrode and the electrocatalyst on the shell side. A perm-selective material such as palladium can be used for such purpose. Alternatively, an electrically conductive perm-selective material can be applied only to one of the cathode and anode components, if desired.

Yet another design utilizing double membrane fabrication employs an electrically conductive inner hollow fiber separator. Such electrically conductive hollow fiber separator may be formed of sintered metal, carbon or graphite. In some embodiments of such double membrane design, an inner current collector may not be needed depending on the electrical conductivity of the inner hollow fiber.

The inner and outer hollow fiber membrane can be of any suitable commercially available membrane material, including, for example, polypropylene, polysulfones, polyacrylonitrile, etc. In one embodiment, the membrane is treated to impart perm-selective characteristics, e.g., to selectively allow permeation of the feed gases (fuel, oxidant) while remaining impermeable to other gases and components (such as fuel impurities) that may be present. By way of specific example, a protective hydrogen-permeable barrier layer can be deposited by solution deposition, electrolytic coating, etc., to provide a film of palladium on the membrane surface that allows passage of hydrogen therethrough, but occludes nitrogen and oxygen. See, for example, Gryaznov et al., "Selectivity in Catalysis by Hydrogen-Porous Membranes," Discussions of the Faraday Society, No. 72 (1982), pp. 73–78; Gryaznov, "Hydrogen Permeable Palladium Membrane Catalysts," Platinum Metals Review, 1986, 30 (2), pp. 68–72; and Armor, "Catalysis with Permselective Inorganic Membranes," Applied Catalysis, 49 (1989), pp. 1–25.

Figure 40:
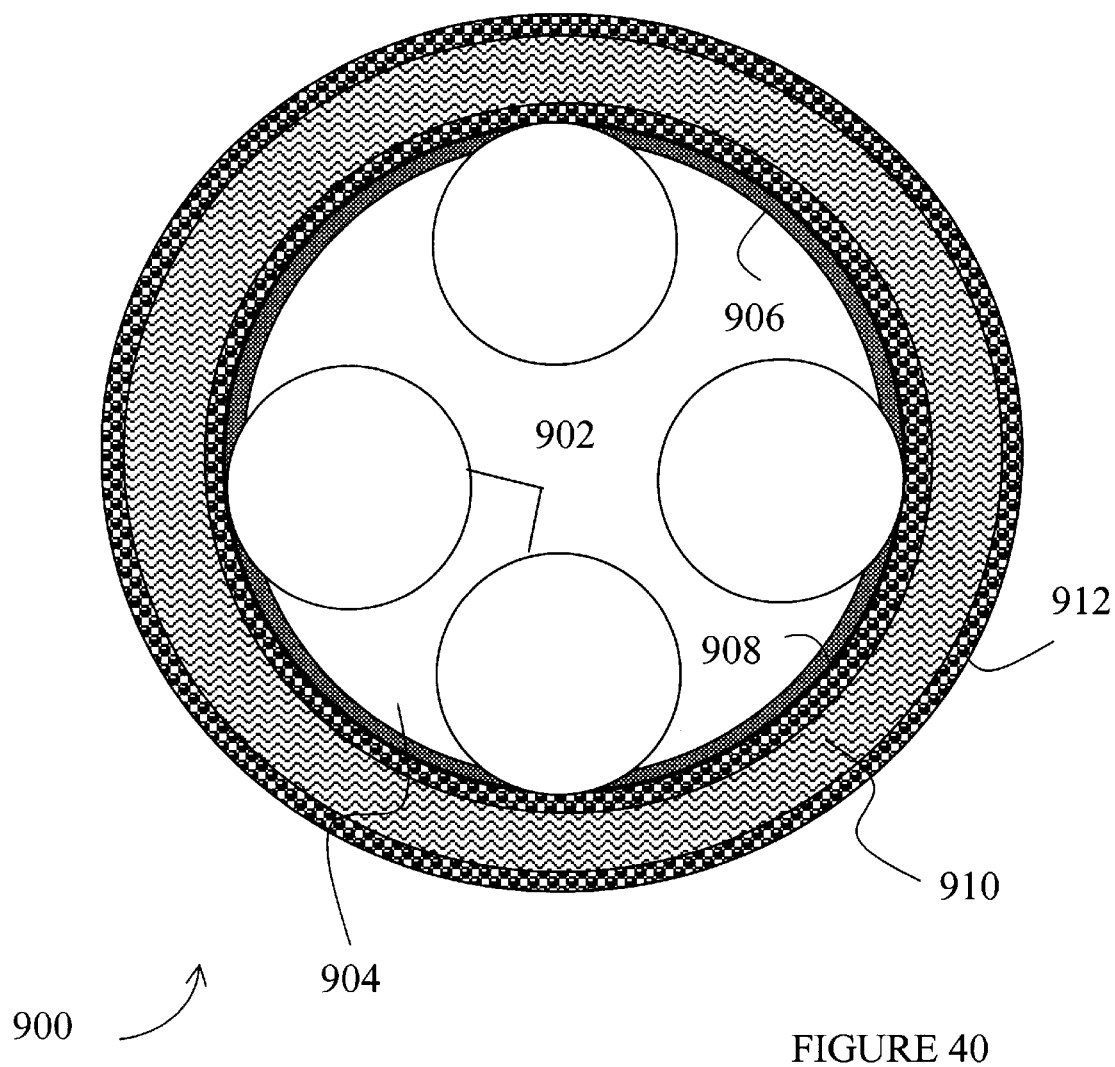
FIG. 40 is a cross-sectional view of a double membrane design with an electrically conductive perm-selective membrane on the anode or cathode element of the microcell.

FIG. 40 is a cross-sectional view of a double membrane design of a microcell 900 with an electrically conductive perm-selective membrane on the anode or cathode element of the microcell. The microcell 900 comprises an outer electrocatalyst layer 912, the microporous membrane/electrolyte matrix 910, electrocatalyst 908, an inner hydrogen- or oxygen-selective membrane 906, and current collector or electrode elements 902 in the inner bore 904.

Figure 41:
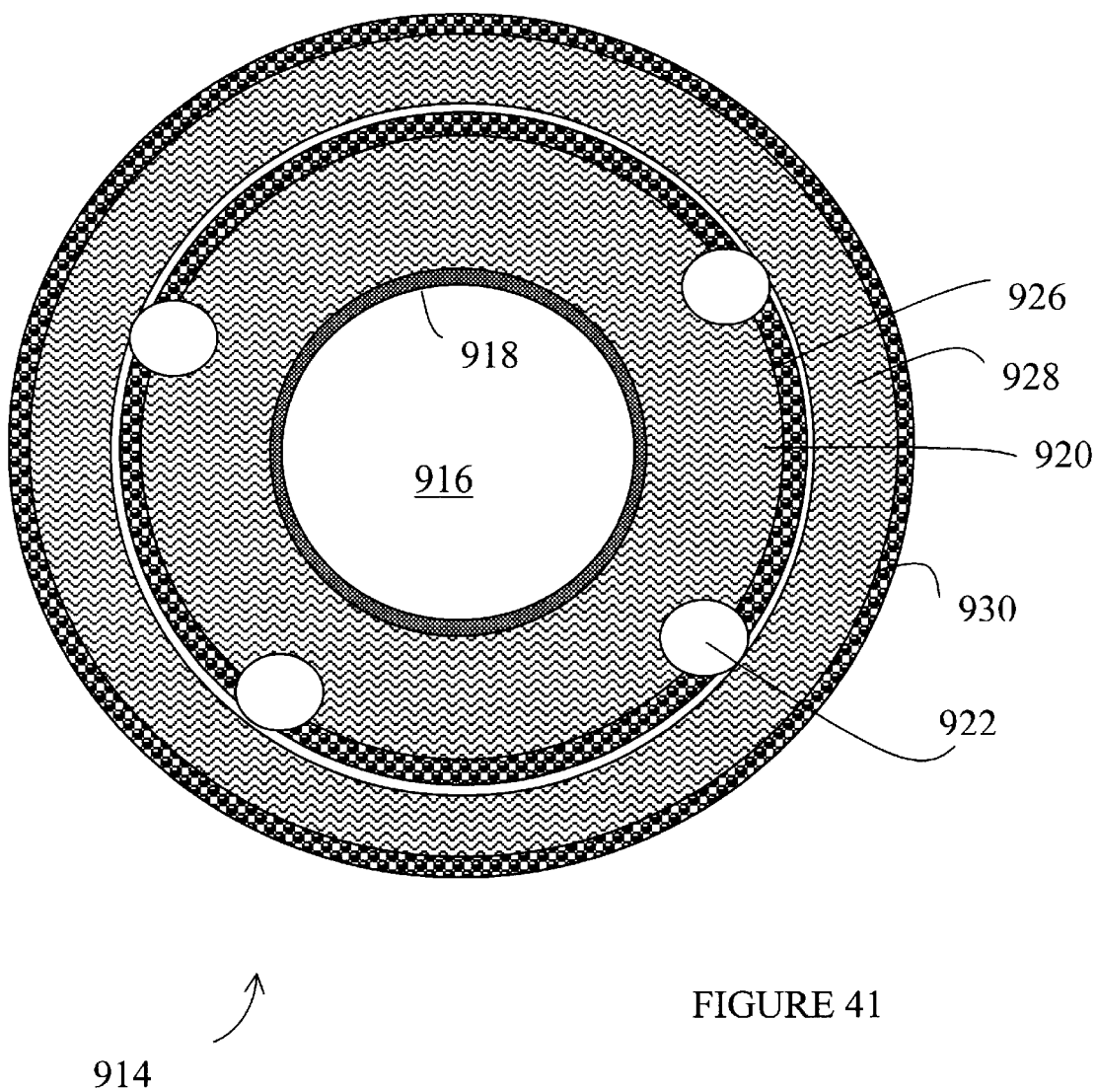
FIG. 41 is a cross-sectional view of a double separator design with perm-selective membranes protecting the anode or cathode elements of the microcell.

FIG. 41 is a cross-sectional view of a double separator design of a microcell 914 with perm-selective membranes protecting the anode or cathode elements of the microcell. The microcell 914 comprises an outer electrocatalyst layer 930, the microporous membrane/electrolyte matrix 928, electrocatalyst 926, current collector or electrode elements 922, inner porous separator 920, an inner hydrogen- or oxygen-selective membrane 918 and an inner bore 916.

Figure 42:
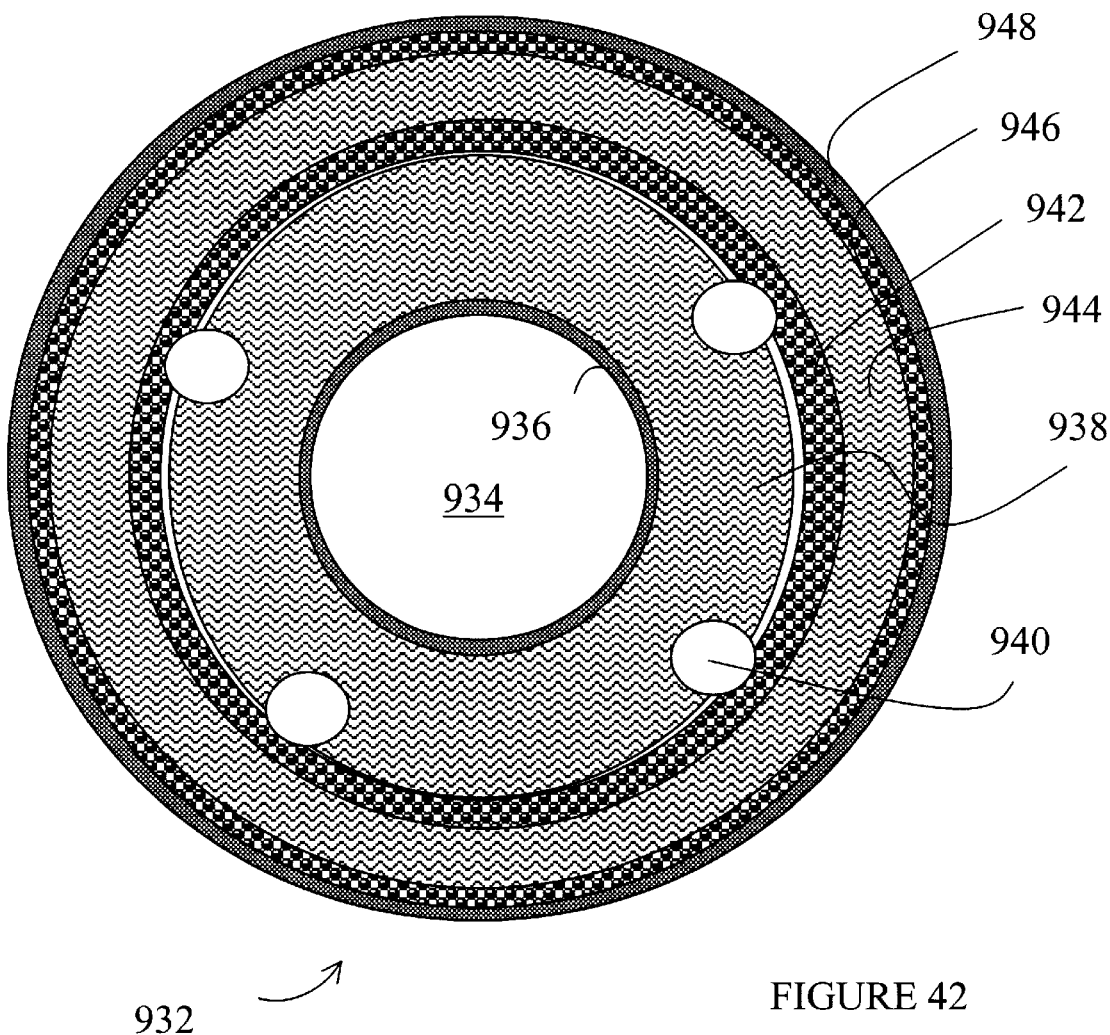
FIG. 42 is a cross-sectional view of a double separator design with perm-selective membranes covering both anode and cathode elements of the microcell.

FIG. 42 is a cross-sectional view of a double separator design of a microcell 932 with perm-selective membranes covering both anode and cathode elements of the microcell. The microcell 932 comprises an outer hydrogen- or oxygen-selective electrically conductive membrane 948, electrocatalyst layer 946, the microporous membrane/electrolyte matrix 944 electrocatalyst 942, current collector or electrode element 940, inner porous separator 938, an inner hydrogen- or oxygen-selective membrane 936 and an inner bore 934.

Figure 43:
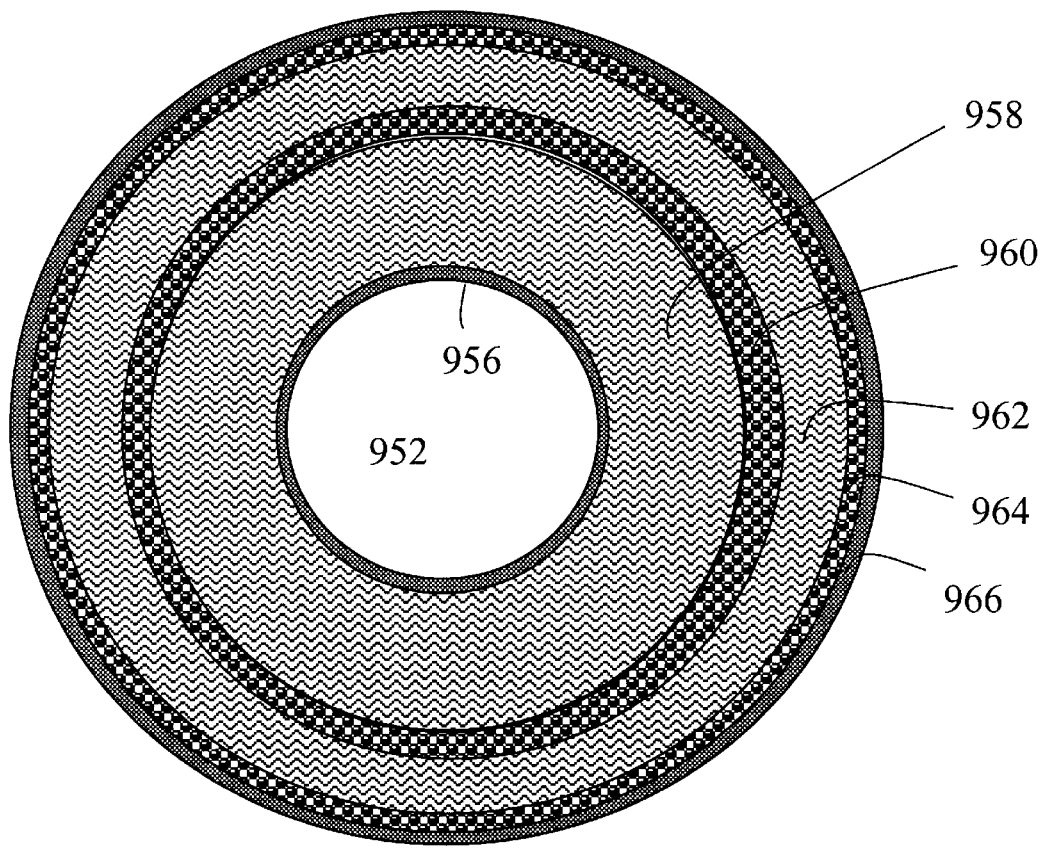
FIG. 43 is a cross-sectional view of a double separator design with perm-selective membranes covering both anode and cathode elements of the microcell and with a porous, electrically conductive inner separator.

FIG. 43 is a cross-sectional view of a double separator design of a microcell 950 with perm-selective membranes covering both anode and cathode elements of the microcell and with an electrically conductive inner separator. The microcell 950 comprises an outer hydrogen- or oxygen-selective electrically conductive membrane 966, electrocatalyst layer 964, the microporous membrane/electrolyte matrix 962, electrocatalyst 960, electrically conductive porous current collector or electrode element 958, an inner hydrogen- or oxygen-selective membrane 956 and an inner bore 952.

Figure 44:
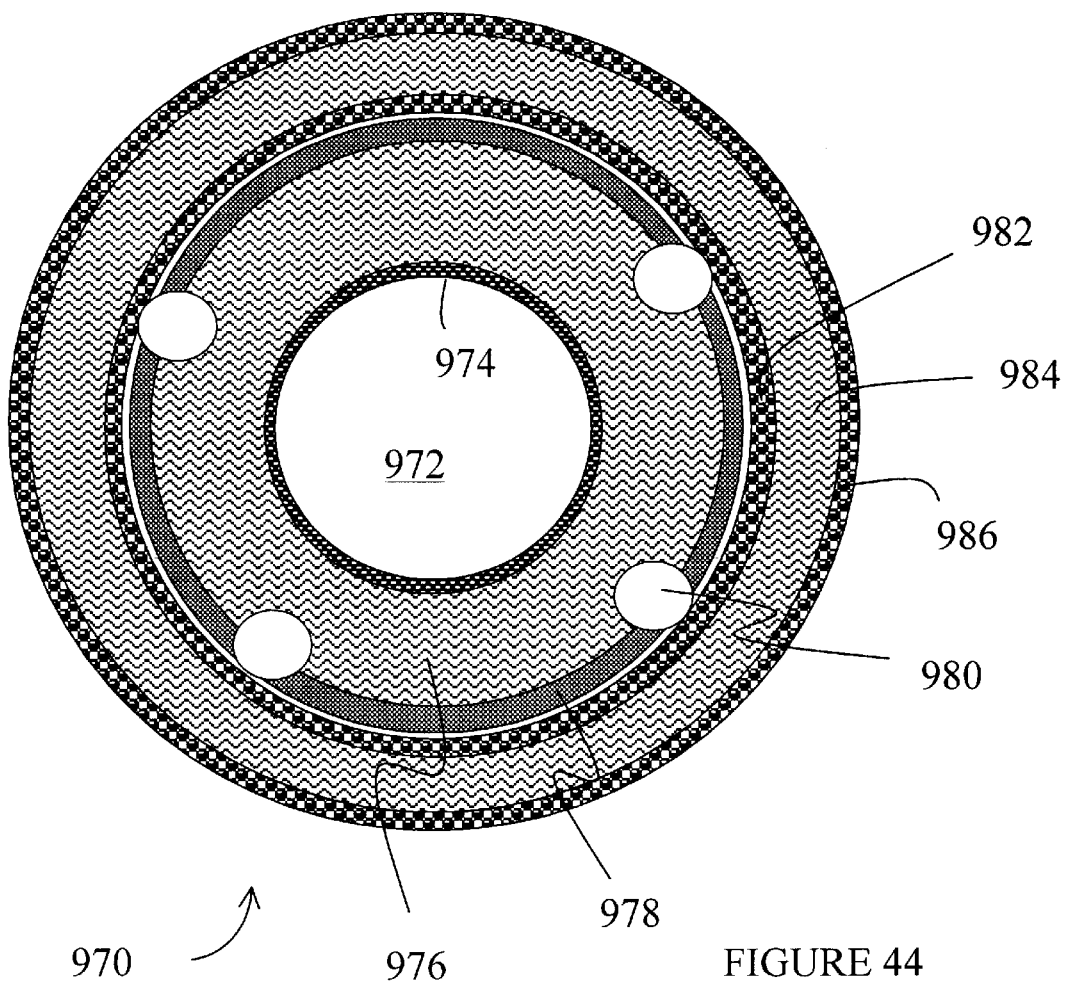
FIG. 44 is a cross-sectional view of a double separator design with perm-selective membranes covering both anode and cathode elements of the microcell and with reformer catalyst on the inner wall of the inner separator.

FIG. 44 is a cross-sectional view of a double separator design of a microcell 970 with perm-selective membranes covering both anode and cathode elements of the microcell and with reformer catalyst on the inner wall of the inner separator. The microcell 970 comprises an outer electrocatalyst layer 986, the microporous membrane/electrolyte matrix 984, electrocatalyst 982, current collector or electrode elements 980, an inner hydrogen- or oxygen-selective membrane 978, inner porous separator 976, CO water shift/reforming catalyst 974, and an inner bore 972.

Manufacture of Microcell Structures and Assemblies Comprising Same

For commercial high-volume production, the microcell device with most of its components desirably is fabricated in a single extrusion step, at high rate. A critical aspect of the high-volume fabrication process is encapsulating the inner electrode with the microporous membrane separator.

For such purpose, a strand or tow of electrically conductive fibers can be passed through the center of the bore former tube of an extrusion mold (spinnerette). The material that will form the backbone of the microporous membrane separator, referred to as a "dope," is extruded around the bore former tube in continuous fashion onto the strand or tow of electrically conductive fiber(s). An internal coagulant fluid, e.g., a gas such as nitrogen or a liquid such as water, is passed through the bore former tube along with the inner electrode fiber(s) or fibrous current collector(s).

In the above-described operation, the size of the microcell fiber is determined by the size of the orifice of the extrusion mold. Such orifice can be widely varied in size, e.g., from as small as 100 microns or smaller, with the membrane correspondingly being as thin as a few microns in thickness.

An electrocatalyst paste is simultaneously extruded through the bore if the method of microcell fabrication utilizes an ink paste. Extruded fiber is immersed in a quenching bath or an external coagulant medium, such as water. As the extruded fiber passes through the coagulation/quench operation, the microporous membrane structure is instantaneously formed around the inner electrode as the water-soluble pore former compound is leached out in the coagulant/quenching medium.

Pore structure, porosity and pore size of the membrane separator thereby are accurately controlled by selection and corresponding control of parameters such as the membrane dope formulation, type of coagulant used, temperature of the spinning operation, etc. Specific conditions are readily determinable for such process by simple experiment without undue effort, by those skilled in the art.

A wide variety of materials is useful to form the microporous membrane separator, including, without limitation, polysulfone, polyacrylonitrile, other high temperature polymers, glass and ceramic materials.

By the above-described spinning process, microcell articles can be fabricated at high rate on a continuous basis.

After formation of the microporous membrane separator-encapsulated inner electrode structure, such encapsulated structure is coated or impregnated on the outside (shell side) with an ion exchange polymer in the case of polymer electrolyte fuel cells, and/or electrocatalyst of the outer electrode. Such exterior coating can be advantageously performed by a similar extrusion process.

Figure 45:
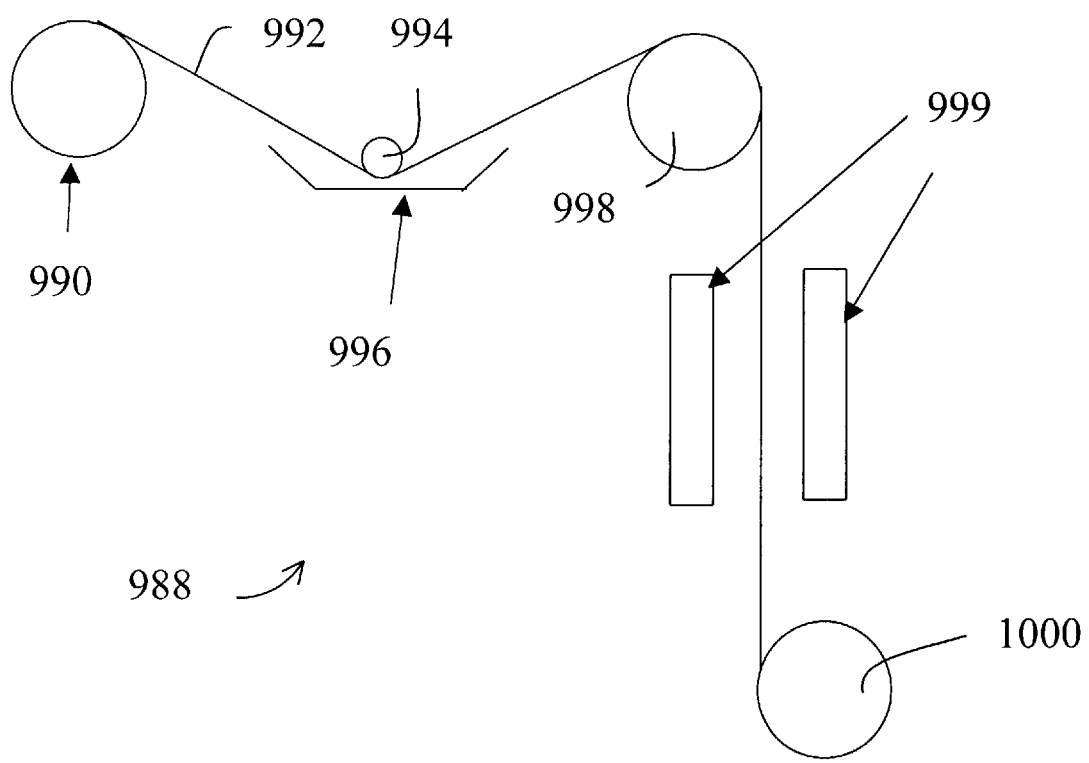
FIG. 45 is a schematic flowsheet of a solution impregnation system for impregnation of a membrane fiber with Nafion or electrocatalyst.

FIG. 45 is a schematic flowsheet of a solution impregnation system 988 for impregnation of a membrane fiber 992 with Nafion or electrocatalyst. The membrane fiber 992 is dispensed from a fiber spool 990 and passes, by action of the roller 994, through a solution bath 996 in which the fiber is impregnated. The impregnated fiber then passes over guide roll 998 and through the bank of heating elements 999 for final collection on take up winder 1000.

Additional applications for electrochemical cells of the invention include production of chemicals. Chemical synthesis applications are advantageously effected utilizing microcells fabricated in accordance with the invention, which provide: high current density per unit volume, as necessary for chemical synthesis; low internal resistance due to minimal electrode membrane distance (thickness); and high efficiency due to low mass transfer resistance.

In addition, microcells fabricated in accordance with the present invention may be utilized to generate hydrogen and oxygen where other forms of electric power are available. In such applications, hydrogen (or other fuel gas) generated by the cell can be stored and used for generation of electricity.

For example, after the porous polymeric membrane has been formed around current collector(s) of a microcell fiber structure, the structure can be directly passed through a solution of aqueous polymeric electrolyte, such as a solution of Nafion (5% solids in water and alcohol) polymeric electrolyte, to impregnate the pores of the porous polymeric membrane with the polymeric electrolyte. The amount of the impregnated polymeric electrolyte may be selectively varied depending on the residence time of the porous polymeric membrane in the electrolyte impregnant composition, and the number of times that the structure is repetitively exposed to the composition (i.e., in single-pass or multi-pass fashion) during processing.

On the same process line in which the electrolyte is impregnated, or alternatively in a subsequent phase of the fabrication operation, the microcell fibers in one process embodiment are dried and impregnated with platinum as the electrocatalyst material, using a plating solution containing $H_2[PtCl_6]$, following which the fibers are passed through a bath of reducing agent, such as sodium borohydride ($NaBH_4$), to reduce the platinum composition to elemental platinum metal.

This continuous technique according to one embodiment of the invention is used to impregnate only the outer shell of the membrane with platinum. The inner wall of the membrane is impregnated after the fibers have been potted in the vessel by pumping the platinum plating solution through the bore of the fibers.

In another embodiment, both the shell and the bore side of the fibers are impregnated after the fibers have been potted.

After the ion exchange Nafion electrolyte solution is impregnated in the pores of the membrane, the electrocatalyst is coated according to another aspect of the invention by using platinum loaded on activated carbon of suitable particle size. The platinum loading on the activated carbon particles typically is in the range of from about 5 to about 10 percent by weight. A paste is prepared consisting essentially of platinum loaded activated carbon, Nafion ionomer as the binder, and a Teflon® polytetrafluoroethylene emulsion. The paste then is coated, or alternatively extruded, on the shell side of the fibers.

Coating of the paste inside the fiber wall may be accomplished in various ways. In one approach, the paste is coextruded while the porous membrane separator element is being spun around the current collector. A second approach is to pre-extrude the paste around the current collector before inserting the current collector into the membrane fiber. As a third approach, a thin paste can be pumped into the bore of the porous membrane separator element after the cell assembly and potting has been completed.

In another embodiment, the electrolyte is deposited inside the porous membrane separator element, and the catalyst is applied by electrodeposition from a solution containing platinum ions, by an electrolytic plating solution process, or by an electroless plating solution process.

Corrosion Management in the Microcell Assembly

In applications of conventional fuel cell technology, current collectors generally have been limited to the use of graphite type materials. Current collectors formed of aluminum or titanium can be coated with corrosion-resistant coatings such as gold, but such coatings tend to peel and delaminate from the current collector element under the severe corrosive conditions and thermal cycles that characterize the fuel cell operation.

The use of microcell elements permits current collector materials of construction other than graphitic materials to be employed. Metal fibers utilized in microcell structures in the electrochemical cell module can be coated by variety of techniques to achieve durable corrosion resistance. Useful coating techniques for such purpose include, without limitation, electrochemical deposition, electroless coating, dipcoating, extrusion, etc., using corrosion resistant metal compositions or polymeric materials such as polyanaline.

A preferred approach for coating metal substrates for use as current collector involves use of amorphous metal compositions deposited by plasma coating techniques. In general, better corrosion resistance is attributable to the amorphous nature of the coating structure. Further, various amorphous metal compositions generate extremely high surface areas. Examples of such high surface area metal compositions include nickel metal hydride electrocatalyst materials. The use of such high surface metal compositions coupled with the inherently high surface area of the fibrous geometry of the microcells enables such amorphous metal coatings to be effectively utilized for hydrogen storage capability in the fuel cell, a potentially significant structural and operational advantage.

As another approach to increase the corrosion resistance of metallic fiber substrates, the metal fibers can be coated with a polymeric precursor or other organic coating, and the coating then is carbonized. Carbonization of the polymer to form graphitic material on metallic fibers yields a coating that is corrosion resistant, yet possesses electrical conductivity that is higher than that of carbon or graphite alone.

The presence of pinholes in any coating application can cause corrosion and electrical disconnection of one section of the microcell from others, which in turn reduces the useful power density of the cell. In another approach, such electrical disconnection deficiencies are avoided by a fabrication method involving co-placement of a carbon fiber in the bore or on the shell side of the microcell, so that the carbon fiber is in intimate contact with the associated current collector of the microcell. With such arrangement, if the current collector is corrosively attacked in the operation of the electrochemical cell, the carbon or graphitic fiber then continues to maintain a flow of current therethrough, thereby providing electrical continuity despite even gross corrosion-mediated breakage or deterioration of the current collector element.

To enhance the service life of metallic current collector fibers in the corrosive environment of a fuel cell, the metal fiber is advantageously coated with a compound such as a polymeric material, following which the coated fiber is subjected to pyrolysis conditions for the polymeric material. The fiber coating material is pyrolyzed and converted to carbon using techniques that are conventionally employed to form carbon fibers per se.

Formation of a continuous layer of carbon on a metallic current collector fiber (of any size) produces a fiber that is electrically conductive radially and longitudinally and at the same time is corrosionresistant due to the surface layer protecting the underlying metal from corrosive attack.

Figures 46, 47:
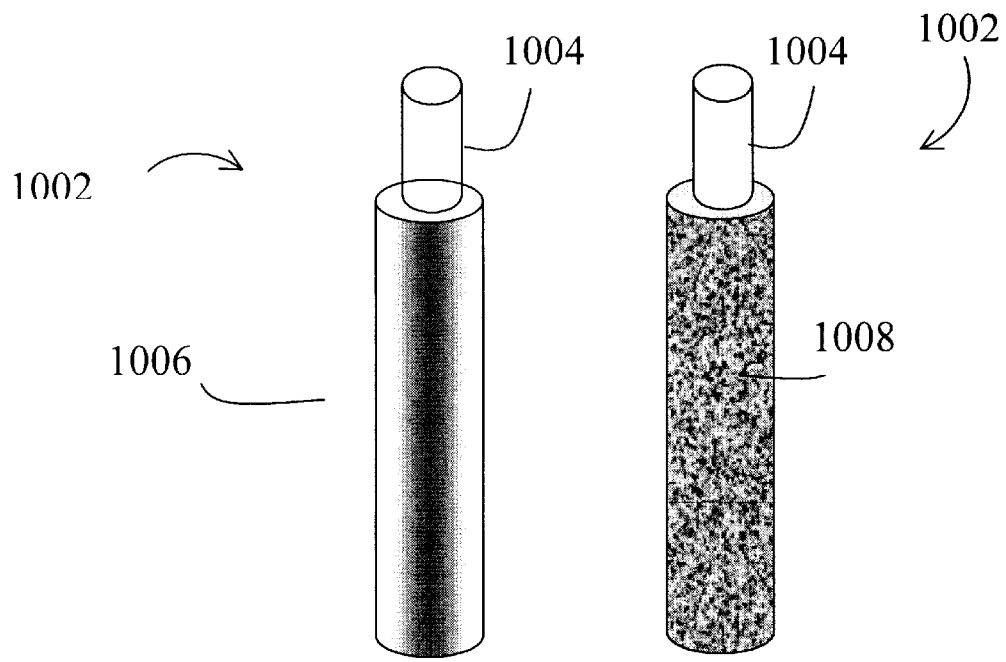
FIG. 46 Is an elevation view of a metallic fiber having a polymeric compound on its outer surface.
FIG. 47 shows the corresponding fiber of FIG. 46 after pyrolysis, with a pyrolyzed carbon coating on the outside surface thereof.

FIG. 46 is an elevation view of a conductor element 1002 including a metallic fiber 1004 having a polymeric compound coating 1006 on its outer surface. The fiber is coated in any suitable manner, e.g., by spraying, dip-coating, roller coating, etc.

FIG. 47 shows the corresponding fiber 1002 of FIG. 46 after the pyrolysis step, as comprising a pyrolyzed carbon coating 1008 on the outside surface thereof.

Concerning current collector and electrode preparation, the electrically conductive metal fibers of the microcell in one embodiment of the invention comprise copper, aluminum or titanium fibers, having a diameter in the range of from about 100 to about 10,000 microns, coated with a-suitable thickness of corrosion-resistant material such as gold or platinum.

Alternatively, carbon/graphite fibers having diameter in the range of from about 100 to about 10,000 microns and having good electrical conductivity characteristics can be employed, and metallized with the electrocatalyst, e.g., platinum. Such platinum metallization is advantageously effected by contacting the fibers with a plating solution containing $H_2[PtCl_6]$, followed by reduction of the platinum compound to elemental platinum metal via contact with sodium borohydride ($NaBH_4$).

Figure 48:
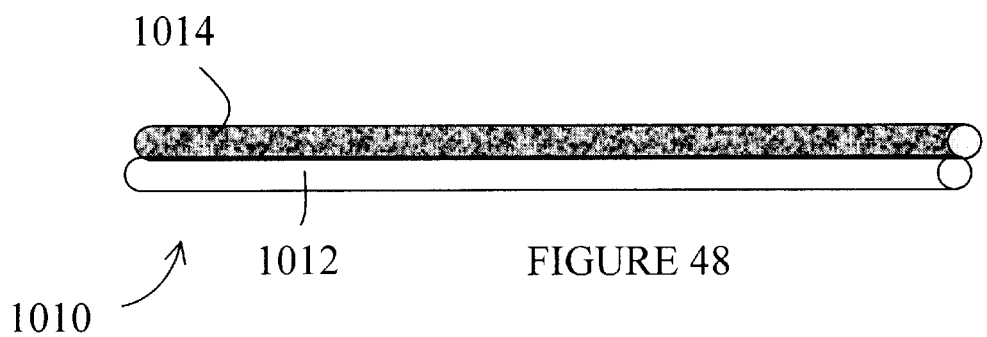
FIG. 48 shows a fibrous carbon current collector laid along a coated metallic fiber.

With respect to current collectors, the presence of pinholes or coating defects causes accelerated corrosion of metallic current collectors. In consequence of such corrosion, the fiber cell can disconnect (as a result of the continuity of the conductor being impaired) and become inoperable. To avoid this disconnection of part of the microcell voltage and current, fibrous carbon current collectors advantageously are laid along the coated metallic fibers. FIG. 48 shows a conductor 1010 including a fibrous carbon current collector 1014 laid along a coated metallic fiber 1012. The carbon fiber 1014 will be in intimate contact with the coated fiber 1012, as shown in FIG. 48.

Figure 49:
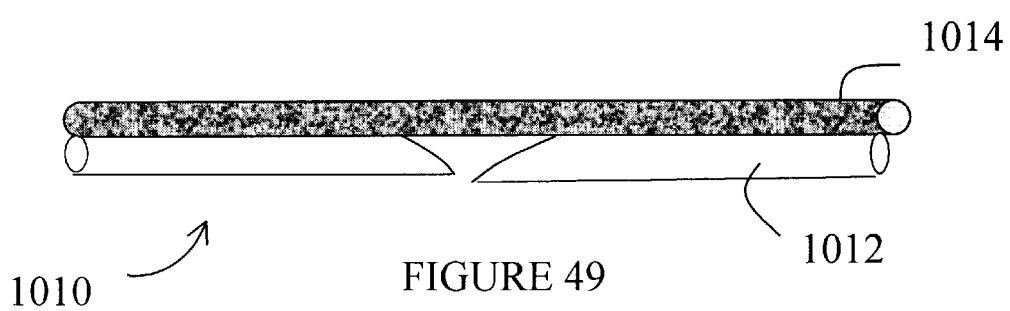
FIG. 49 shows the fiber assembly of FIG. 48 after a disconnection break of the coated metallic fiber.

FIG. 49 shows the fiber assembly of FIG. 48 after a disconnection break of the coated metallic fiber 1012. In the event of a corrosion point break in continuity of the coated metallic fiber, the carbon fiber 1014 in contact with both sections of the corroded metal fiber 1012 provides continuity enabling the current to pass from one side to the other along the length of the carbon fiber/metallic fiber arrangement.

Water Management in Microcell Assemblies

In microcell electrochemical reactions wherein water is a reaction by-product, a feed may be humidified to prevent drying of the membrane, the microcell assembly desirably includes a water management system for addition and removal of excess water from the microcell assembly.

In general, the high surface area of microcell structures, and lower mass transfer resistance, mean that the removal of water from the microcell module is less problematic than in conventional planar fuel cell structures.

Various alternatives can be employed to further enhance the water management capacity of the microcell fuel cell module. For example, if heat exchange tubes are employed in the fuel cell assembly, comprising hollow fiber membranes coated with Nafion or other ion-exchange polymer or material that will selectively allow water permeation, and if the heat exchange liquid is water, the heat exchange tubes can be used for water supply to the fuel cell and removal of heat from the fuel cell.

One approach for water removal from the fuel cell is to provide porous plane hollow fiber membranes in the microcell bundle, in distributed fashion therein. In this structural arrangement, water will permeate through the membrane wall by a wicking action during operation of the fuel cell and will be channeled down the bore of the hollow fiber and away from the active surfaces. The resultingly channeled water then can be collected in a plenum provided in the housing containing the module, for discharge from the system.

Concerning the removal of water from fuel cells, various approaches are contemplated by the present invention. To remove water produced in the fuel cell made from fiber cells or microcells, hollow fiber membranes treated with a hydrophilic compound can be packed intermittently with fiber cells containing an electrode or current collector. Since these hollow fiber membranes are in intimate contact with the shell side of the cells and are open on the bore side, water produced in the fuel cell is absorbed by a wicking action and channeled down the bore of the membrane hollow fiber membrane away from the cells containing the electrode, thereby eliminating the water flooding in the cell.

If the module is mounted vertically, then water may be collected by gravity collection at the bottom of the cell and discharged therefrom.

Figure 50:
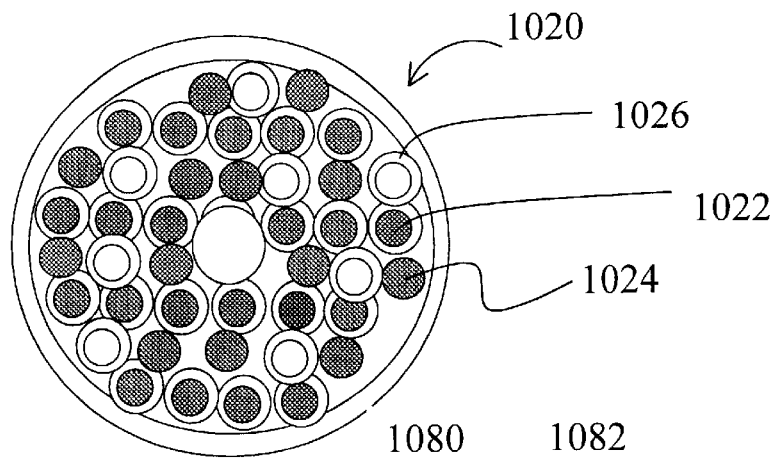
FIG. 50 shows a cross-section of a hollow fiber and microcell tube bundle, in which the plane hollow fiber elements are used for channeling water from the assembly.
Figure 51:
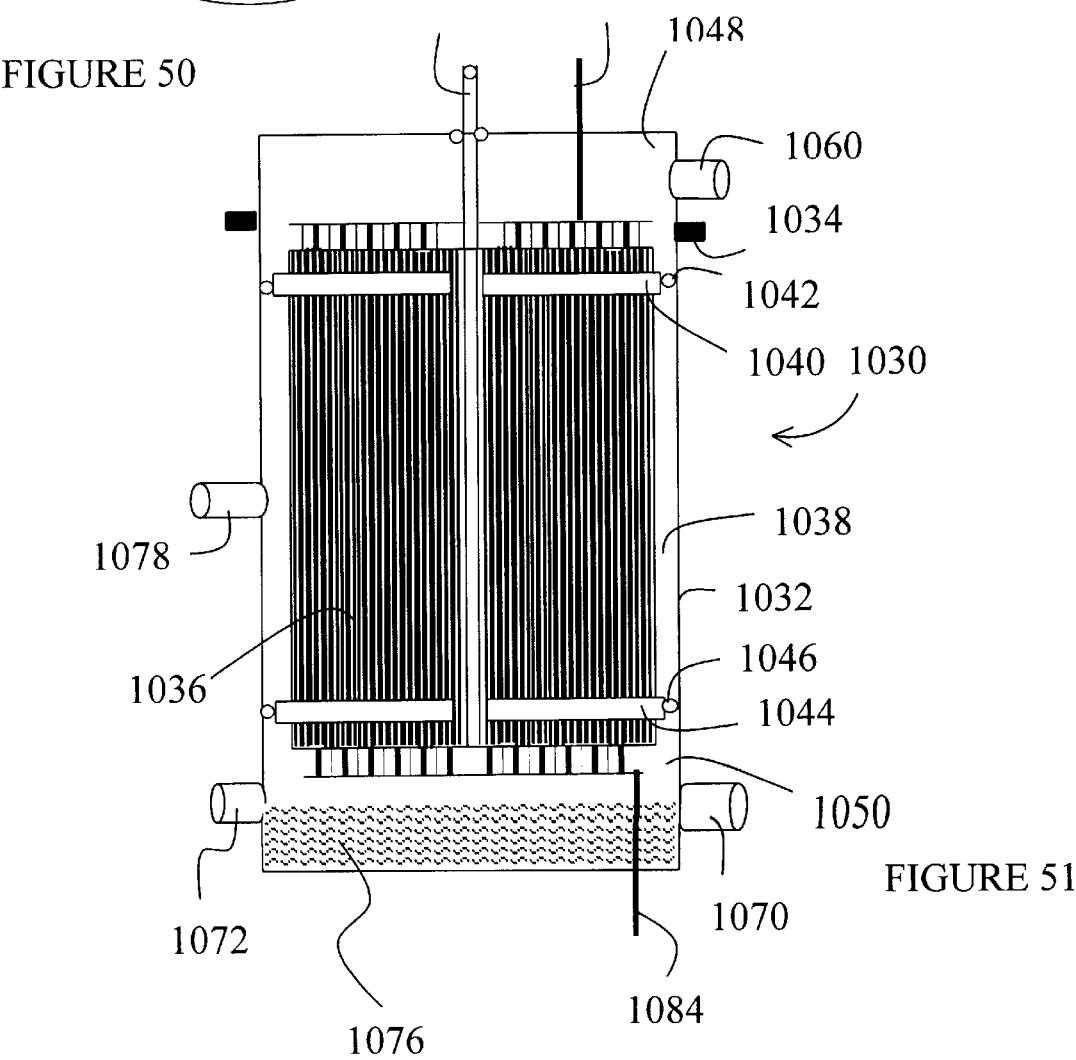
FIG. 51 shows a vertically upward extending bundle of microcells, arranged so that water from the module drains to a lower plenum space for removal.

FIG. 50 shows a cross-section of a hollow fiber and microcell tube bundle 1020, in which the plane hollow fiber elements 1026 are interspersed with the microcell fiber elements 1022 and shell side electrodes 1024, and such hollow fiber elements are used for channeling water from the assembly. FIG. 51 is a sectional elevation view of a microcell fuel cell module 1030, including a housing 1032 containing a microcell assembly 1036 arranged vertically as shown. The housing 1032 has a flange 1034 by means of which the upper end of the housing can be removed to access the microcell assembly and other internal components of the module.

The microcell assembly 1036 is potted at its upper end by potting member 1040 leak-tightly sealed to the inner wall of the housing by O-ring sealing element 1042. In like manner, the microcell assembly 1036 is potted at its lower end by potting member 1044 leak-tightly sealed to the inner wall of the housing by O-ring sealing element 1046.

The microcell assembly 1036 engages a central feed tube 1080, which is perforate within the interior volume of the microcell assembly. Additionally, feed inlet 1060 provides feed to the bore side of the microcell elements in the assembly, from upper end volume 1048. Feed discharged at the lower end from the hollow fiber elements enters the lower end volume 1050 and is discharged from the housing from outlet 1072 or outlet 1070.

Outlet 1078 is provided for interior volume 1038 of the housing, for discharge of spent feed from the interior volume (shell side).

The lower end of housing 1032 constitutes a plenum chamber 1076 which receives access water (condensate) gravitationally flowed to such lower end of the housing, and discharged by overflow through outlet 1072 or outlet 1070.

The current collector elements at respective ends of the microcell assembly are joined to respective terminals 1082 and 1084, as illustrated.

Accordingly, the hollow fiber tubular elements employed in the microcell assembly allow permeation of excess water in to the bore passages of such hollow fibers and drainage thereof to the plenum chamber, to readily remove excess water from the electrochemical fuel cell module.

Any other suitable means or methods can be used to channel water from the microcell assembly, including elements or structures that utilize surface tension or capillarity effects to induce channelized flow of water from the microcell bundle to a collection vessel or locus. By way of example, the enhancement structure for film condensation apparatus that is described in U.S. Pat. No. 4,253,519 issued Mar. 3, 1981 to Leslie C. Kun and Elias G. Ragi is usefully employed as an overlay structure on the microcell fibers or bundles or sub-bundles comprising same, to effect channelized flow of liquid for recovery and discharge thereof from the fuel cell module.

In each of the foregoing approaches, the electrolyte/catalyst-impregnated coated fiber can be optionally coated with a Teflon® polytetrafluoroethylene emulsion, to impart hydrophobicity to the membrane/electrode assembly. By such expedient, water introduced or formed in the cell will be repelled from the catalyst surface, to enhance the availability of the catalyst site to the fuel or the oxidant (e.g., hydrogen, or oxygen).

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A microcell assembly, wherein each microcell comprises:
    an inner electrode,
    a microporous membrane separator in contact with the inner electrode,
    an electrolyte in pores of the microporous membrane separator,
    an outer electrode,
    said assembly comprising a first cell including a first microcell sheet member comprising a plurality of microcell fibers parallelly arranged and interconnected in a substantially planar conformation, with inner current collectors of said microcell fibers axially extending from a first edge of the first cell, and a second sheet member of external current collectors overlying the first microcell sheet member, with each external current collector in contact with at least one microcell fiber of the first microcell sheet member and extending beyond a second, opposite edge of the first cell;
    an insulating sheet for electrical isolation of the first cell from a further cell overlying the insulating sheet;
    a second cell including a third microcell sheet member comprising a plurality of microcell fibers parallelly arranged and interconnected in a substantially planar conformation, with inner current collectors of said microcell fibers axially extending from one edge of the second cell that is adjacent to the second, opposite edge of the first cell, and a fourth sheet member of external current collectors overlying the third microcell sheet member, with each external current collector in contact with at least one microcell fiber of the third microcell sheet member and extending beyond the other,,opposite edge of the second cell that is adjacent to the first edge of the first cell;
    so that the inner current collectors of the first cell are aligned with and electrically connected to the external current collectors of the second cell to form a series connection therewith.

2. The microcell assembly of claim 1 wherein the collectors are interconnected by soldering, brazing, welding, conductive adhesive bonding, or melt bonding.

3. The microcell assembly of claim 1, comprising a multicell structure comprising a plurality of cells arranged in an alternating manner, wherein each cell is electrically isolated from an adjacent cell by the insulating sheet, wherein the inner current collectors of each cell extend beyond one edge of the cell and align with the external current collectors of the adjacent cells, wherein the external current collectors of each cell extend beyond the other, opposite edge of the cell and align with the inner current collectors of the adjacent cells, and wherein the plurality of cells are serially connected to each other, by electrically connecting the inner current collectors of each cell with the external current collectors of a preceding or a following cell.

4. The microcell assembly of claim 1, wherein the successive cells are potted at each of opposite ends to seal the shell side and bore side of the microcells.

5. A microcell module, comprising:
    a gas-feed chamber including a perforate plate member;
    a microcell assembly as in claim 1 positioned on the perforate plate member, and potted at respective ends thereof by potting members forming respective seal faces which when the seal faces at their periphery are abuttingly reposed in a housing, form a shell and tube structural arrangement, wherein the perforate plate member is intermediately positioned between the potting members.

6. The microcell module of claim 5, circumscribingly enclosed in said shell and tube structural arrangement.

7. A microcell sub-bundle article, comprising a microcell assembly of claim 1 rolled into a cylindrical pre-form, applying a porous and electrically insulative wrap to the outer cylindrical surface of the cylindrical pre-form, and potting at respective ends of the cylindrical pre-form, to yield said sub-bundle.

8. A microcell sub-bundle article according to claim 7, further comprising a central tubular member that is perforate over an intermediate length thereof between the potted ends, and otherwise imperforate outside of the potted ends.

9. A method of forming a microcell sub-bundle article, comprising:
    fabricating a microcell assembly of claim 3;
    rolling said microcell assembly into a cylindrical pre-form;
    applying a porous and electrically insulative wrap to the outer cylindrical surface of the cylindrical pre-form; and
    potting at respective ends of the cylindrical pre-form, to yield said sub-bundle article.

10. A microcell sub-bundle article comprising a microcell assembly of claim 3 rolled into a cylindrical pre-form, applying a porous and electrically insulative wrap to the outer cylindrical surface of the cylindrical pre-form, and potting at respective ends of the cylindrical pre-form, to yield said sub-bundle.

11. A microcell sub-bundle article according to claim 7, wherein the article comprises a repeating sequence of first, second, third, and fourth sheet members forming a multiplicity of cells, wherein each cell is separated from an adjacent cell by a porous, electrically insulative sheet member.

12. A method of fabricating a microcell module, comprising:
    providing a gas feed chamber including a perforate plate member;
    positioning on the perforated plate member a microcell assembly as in claim 1, and potting the microcell assembly at respective ends thereof by potting members forming respective seal faces which when the seal faces at their periphery are abuttingly reposed in a housing, form a shell and tube structural arrangement, wherein the perforated plate member is intermediately positioned between the potting members.

13. A method according to claim 12, comprising circumscribingly enclosing the microcell module in a housing to form said shell and tube structural arrangement.

14. A method of fabricating a microcell sub-bundle article, comprising:

forming a microcell assembly of claim 1, axially rolling the microcell assembly into a cylindrical pre-form, applying a porous and electrically insulative wrap to the outer cylindrical surface of the cylindrical pre-form; and potting at respective ends of the cylindrical pre-form, to yield said sub-bundle.

15. A method according to claim 14, wherein the sheet assembly is rolled on a central tubular member that is perforate over an intermediate length thereof between the potted ends, and otherwise imperforate outside of the potted ends.

16. A microcell article comprising a series of microcell sub-bundle articles as in claim 10, sequentially connected in positive-to-negative electrode arrangement, in a bundle wherein component sub-bundle articles are parallelly aligned with one another in side-by-side relationship of consecutive sub-bundle articles, and the bundle has an axial dimension that substantially equal to the axial dimension of each sub-bundle article in the bundle.

17. The microcell article of claim 16, wherein the component sub-bundle articles are packed into the bundle in an alternating manner, wherein a positive terminal end of a sub-bundle article is in proximity to a negative terminal end of an adjacent sub-bundle, so that said positive terminal end of a sub-bundle article can be connected to the negative terminal end of an adjacent sub-bundle to form a series connection.

18. The microcell article of claim 17, wherein the adjacent sub-bundle articles are connected by an end plate having an imprint of series connections of the adjacent positive and negative terminal ends of the sub-bundle articles, so that electrical connection of the end plate with each negative and positive ends of the sub-bundle articles yields a series connection.

19. A microcell article as in claim 16, wherein the bundle is potted at respective ends, and wherein each sub-bundle article comprises a central tubular member that is perforate over an intermediate length thereof between the potted ends, and otherwise imperforate outside of the potted ends.

20. A microcell article as in claim 19, further comprising a feed distribution manifold joined in feed relationship to the central tubular member of each of the multiple sub-bundles.

21. A microcell sub-bundle as in claim 10, wherein the potted ends define respective tubesheets, with each tubesheet having a sealable periphery.

22. A microcell module comprising a housing having mounted therein a plurality of microcell sub-bundles as in claim 21, wherein the housing comprises an interior volume bounded by respective end-plates, each end-plate having openings therein each of which is matably and sealingly engageable with a tubesheet of a corresponding sub-bundle, and wherein corresponding end-plate openings of the respective end-plates are in coaxial register with one another, said housing including a first end volume bounded by the end-plate at one end of the housing, and a second end volume bounded by the end-plate at the other end of the housing, a feed tube arranged for delivery of feed to said sub-bundles, and an outlet for discharging depleted feed from the interior volume, said housing being selectively openable to expose an end-plate at at least one of said end volumes for accessing sub-bundles mounted in said end-plate for removal thereof and installation of a replacement sub-bundle, wherein said sub-bundles in said housing are series connected with one another and connected to a terminal leak-tightly extending exteriorly of the housing.

23. A microcell module according to claim 22, further comprising a feed distribution manifold connected with said feed tube and joined in feed relationship to the central tubular member of each of the multiple sub-bundles.

24. A microcell module according to claim 22, wherein the feed tube extends through one of the end volumes and is joined in closed gas flow communication with the interior volume.

25. A microcell module according to claim 22, wherein the respective end-plates have mounted therein less than a full complement of sub-bundles, and wherein an end-plate opening not having a sub-bundle mounted therein is leak-tightly sealed with a closure plate at corresponding openings in the respective end-plates.

26. A method of fabricating a microcell article, comprising:

fabricating a plurality of microcell sub-bundle articles as in claim 10, parallelly aligning said sub-bundle articles with one another in side-by-side relationship of consecutive sub-bundle articles, thereby forming a bundle of said sub-bundle articles that has an axial dimension that substantially equal to the axial dimension of each sub-bundle article, and electrically interconnecting the sub-bundle articles in positive-to-negative electrode arrangement to form a series connection.

27. The method of claim 26, wherein the component sub-bundle articles are positioned in the bundle in an alternating manner, wherein a positive terminal end of a sub-bundle article is in proximity to a negative terminal end of an adjacent sub-bundle, so that said positive terminal end of a sub-bundle article can be connected to the negative terminal end of an adjacent sub-bundle to form a series connection.

28. The microcell assembly of claim 1, wherein the membrane separator is fabricated from a material selected from the group consisting of semi-permeable, ion-exchange membranes, and a porous membrane coated on a shell or bore side thereof with a perm-selective or an ion-exchange polymer.

29. A method of fabricating a microcell assembly, comprising:

forming a first layer including a first microcell sheet member comprising a plurality of fibrous microcell elements parallelly arranged and interconnected in a substantially planar conformation, with inner current collectors of said fibrous microcell elements axially extending from a first edge of the first layer, and a second sheet member of: external current collectors overlying the first microcell sheet member, positioning each current collector in contact with at least one microcell fiber of the first microcell sheet member and extending beyond an opposite, second edge of the first layer;

disposing an insulating sheet on said first layer;

forming a second layer including a third microcell sheet member comprising a plurality of fibrous microcell elements parallelly arranged and interconnected in a substantially planar conformation, with inner current collectors of said fibrous microcell elements axially extending from one edge of the second layer that is adjacent to the opposite, second edge of the first layer, and a fourth sheet member of external current collectors overlying the third microcell sheet member, positioning each current collector in contact with at least one microcell fiber of the third microcell sheet member and extending beyond the other, opposite edge of the; second layer that is adjacent to the first edge of the first layer; and electrically connecting the inner current collectors of the first layer with the external current collectors of the second layer to form a series connection therewith.

30. The method of claim 29, further comprising potting the microcell assembly to seal the shell side and bore side of the fibrous microcell elements from one another.

31. The method of claim 29, wherein the current collectors are interconnected by soldering, brazing, welding, conductive adhesive bonding, or melt bonding.

32. The method of claim 29, comprising forming a multicell assembly comprising a multiplicity of said first and second layers arranged in an alternating manner, wherein each layer is electrically isolated from an adjacent layer by the isolating sheet, wherein the inner current collectors of each layer extend beyond one edge of the layer and align with the external current collectors of the adjacent layers, wherein the external current collectors of each layer extend beyond the other, opposite edge of the layer and align with the inner current collectors of the adjacent layers, and electrically interconnecting the inner current collectors of each layer with the external current collectors of a successive layer to form a series relationship.

33. The method of claim 29, wherein each of said fibrous microcell elements comprises a porous membrane separator, wherein the membrane separator is fabricated from a material selected from the group consisting of semi-permeable, ion-exchange membranes, and a porous membrane coated on a shell or bore side thereof with a perm-selective or an ion-exchange polymer.

34. A series-connected assembly, comprising a series of microcell sub-bundle articles sequentially connected in positive-to-negative electrode arrangement and having an elongate character, wherein each microcell sub-bundle article comprising:

a sheet assembly including a first microcell sheet member comprising a plurality of microcell fibers parallelly arranged and interconnected in a substantially planar conformation, with inner current collectors of said microcell fibers axially extending from a first edge of the first microcell sheet member, and a second sheet member of external current collectors overlying the first microcell sheet member, with each current collector in contact with at least one microcell fiber of the first microcell sheet member and extending beyond an opposite, second edge of the first microcell sheet member;

wherein each microcell sub-bundle article has been formed by axially rolling the sheet assembly into a cylindrical pre-form, applying a porous and electrically insulative wrap to the outer cylindrical surface of the cylindrical pre-form, and potting at respective ends of the cylindrical pre-form to yield said sub-bundle article, and wherein each two adjacent microcell sub-bundle articles are serially connected by a flexible connector, said connector comprising a pair of crimpable conductive leaves that are spaced apart and interconnected by a flexible conductive yoke element, and wherein each crimpable conductive leaf compressively grip a protuberant group of current collectors of a sub-bundle.

35. A series-connected assembly, comprising a series of microcell sub-bundle articles sequentially connected in positive-to-negative electrode arrangement and having an elongate character, wherein each microcell sub-bundle.article comprising:

a sheet assembly including a first microcell sheet member comprising a plurality of microcell fibers parallelly arranged and interconnected in a substantially planar conformation, with inner current collectors of said microcell fibers axially extending from a first edge of the first microcell sheet member, and a second sheet member of external current collectors overlying the first microcell sheet member, with each external current collector in contact with at least one microcell fiber of the first microcell sheet member and extending beyond an opposite, second edge of the first microcell sheet member;

wherein each microcell sub-bundle article has been formed by axially rolling the sheet assembly into a cylindrical pre-form, applying a porous and electrically insulative wrap to the outer cylindrical surface of the cylindrical pre-form, and potting at respective ends of the cylindrical pre-form to yield said sub-bundle article, and wherein the connection between each two adjacent microcell sub-bundle articles comprises welding, brazing, soldering, conductive adhesive bonding, or melt bonding.

36. A method of making an electrochemical cell device, comprising:

forming a layer structure of sheets including at least a first sheet of fibrous microcell elements arranged in parallel side-by-side arrangement, with inner current collectors of said fibrous microcell elements axially extending from a first edge of the layer structure, and a second sheet of external current collectors in a parallelly aligned spaced-apart arrangement;

mating the first and second sheets in longitudinally off-set relationship to one another, so that the second sheet of external current collectors extends beyond a second, opposite edge of the layer structure;

adding additional layers of corresponding first and second sheets to the initial layer of first and second sheets, and disposing a porous insulative sheet between each of the respective layers, to form a multilayer structure, wherein the inner current collectors of each layer extend beyond one edge of the layer structure and align with the external current collectors of adjacent layers, wherein the external current collectors of each layer, extend beyond the other, opposite edge of the layer structure and align with the inner current collectors of adjacent layers, and wherein the layers of corresponding first and second sheets are serially connected to each other, by electrically connecting the inner current collectors of each layer with the external current collectors of a preceding or a following layer;

shaping said multilayer structure into a predetermined sub-bundle shape, and potting same to impart a permanent shape thereto, wherein said permanent shape provides localized conformations of internal and external current collectors;

fabricating a plurality of sub-bundles in corresponding manner;

connecting said sub-bundles in sequence to form a series arrangement of sub-bundles; and shaping the series-connected sub-bundles to form a bundle assembly.

37. A method for forming a series-connected assembly that comprises a series of microcell sub-bundle articles sequentially connected in positive-to-negative electrode arrangement and has an elongate character, comprising:

forming each sub-bundle article by: (1) fabricating a sheet assembly including a first microcell sheet member comprising a plurality of microcell fibers parallelly arranged and interconnected in a substantially planar conformation, with inner current collectors of said microcell fibers axially extending from a first edge of the sheet assembly, and a second sheet member of external current collectors overlying the first microcell sheet member, with each external current collector in contact with at least one microcell fiber of the first microcell sheet member and extending beyond an opposite, second edge of the sheet assembly, and (2) axially rolling the sheet assembly into a cylindrical pre-form, applying a porous and electrically insulatvie wrap to the outer cylindrical surface of the cylindrical pre-form; and potting at respective ends of the cylindrical pre-form to yield said sub-bundle article, electrically connecting the microcell sub-bundle articles in series, by interconnecting successive sub-bundle articles with a flexible connector comprising a pair of crimpable conductive leaves that are spaced apart and interconnected by a flexible conductive yoke element, and wherein each crimpable conductive leaf compressively grip a protuberant group of current collectors of a sub-bundle article.

38. A method for forming a series-connected assembly that comprises a series of microcell sub-bundle articles sequentially connected in positive-to-negative electrode arrangement and has an elongate character, comprising:

forming each sub-bundle article by: (1) fabricating a sheet assembly including a first microcell, sheet member comprising a plurality of microcell fibers parallelly arranged and interconnected in a substantially planar conformation, with inner current collectors of said microcell fibers axially extending from a first edge of the sheet assembly, and a second sheet member of external current collectors overlying the first microcell sheet member, with each external current collector in contact with at least one microcell fiber of the first microcell sheet member and extending beyond an opposite, second edge of the sheet assembly, and (2) axially rolling the sheet assembly into a cylindrical pre-form, applying a porous and electrically insulative wrap to the outer cylindrical surface of the cylindrical per-form, and potting at respective ends of the cylindrical pre-form to yield said sub-bundle article, electrically connecting the microcell sub-bundle article in series, by welding, brazing, soldering, conductive adhesive bonding, or melt bonding.

* * * * *